(12) United States Patent
Nakao et al.

(10) Patent No.: US 11,807,182 B2
(45) Date of Patent: Nov. 7, 2023

(54) ROPS FRAME FOR WORK VEHICLE, AND WORK VEHICLE

(71) Applicant: Kubota Corporation, Osaka (JP)

(72) Inventors: Kohta Nakao, Sakai (JP); Yuki Monde, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/838,927

(22) Filed: Jun. 13, 2022

(65) Prior Publication Data

US 2023/0093636 A1    Mar. 23, 2023

(30) Foreign Application Priority Data

Sep. 21, 2021   (JP) ................................. 2021-153445

(51) Int. Cl.
*B60R 21/13* (2006.01)
*B60R 21/00* (2006.01)

(52) U.S. Cl.
CPC ...... *B60R 21/13* (2013.01); *B60R 2021/0018* (2013.01); *B60R 2021/0083* (2013.01)

(58) Field of Classification Search
CPC ...... B60R 21/13; B60R 2021/00; F16L 23/00; F16L 21/00; F16L 25/00
See application file for complete search history.

(56) References Cited

U.S. PATENT DOCUMENTS

| 8,827,357 | B2 | 9/2014 | Kaku et al. |
| 10,974,573 | B2 | 4/2021 | Cotnoir |
| 2009/0273169 | A1* | 11/2009 | Bowers ................... B60R 21/13 280/756 |
| 2014/0103627 | A1 | 4/2014 | Deckard et al. |
| 2019/0232910 | A1* | 8/2019 | Hisamura ............ B62D 27/065 |
| 2020/0346526 | A1* | 11/2020 | Cotnoir .................. B60J 5/0406 |

FOREIGN PATENT DOCUMENTS

| DE | 102008036628 A1 * | 2/2010 | ............ B60R 21/13 |
| JP | 2009280090 A | 12/2009 | |
| KR | 101167921 B1 * | 7/2012 | |

OTHER PUBLICATIONS

Jeong, Plumbing Device of Pump Tower, Jul. 30, 2012, EPO, KR 101167921 B1, Machine Translation of Description (Year: 2012).*
Hasenmaier, Roll Bar For Motor Vehicle, Particularly For Convertible Car, Has Screw Connections Which Have Screws, Upper Clamping Elements And Lower Clamping Elements, Feb. 11, 2010, EPO, DE 102008036628 A1, Machine Translation of Description (Year: 2010).*

* cited by examiner

*Primary Examiner* — Paul N Dickson
*Assistant Examiner* — Matthew D Lee
(74) *Attorney, Agent, or Firm* — THE WEBB LAW FIRM

(57) ABSTRACT

A ROPS frame for a work vehicle includes: a first pipe having an end; a second pipe having an end facing the end of the first pipe; a plate-shaped first joint coupled to the end of the first pipe and oriented orthogonally to a longitudinal direction of the pipes; a plate-shaped second joint coupled to the end of the second pipe and oriented orthogonally to the longitudinal direction of the pipes, the second joint being placed on the first joint; and a bolt extending through the first and second joints and fastening the first and second joints to each other.

8 Claims, 17 Drawing Sheets

ROPS FRAME FOR WORK VEHICLE, AND WORK VEHICLE

CROSS-REFERENCE TO RELATED APPLICATION

This application claims priority to Japanese Patent Application No. 2021-153445 filed Sep. 21, 2021, the disclosure of which is hereby incorporated by reference in its entirety.

BACKGROUND OF THE INVENTION

1. Field of the Invention

The present invention relates to a ROPS frame for a work vehicle that includes a plurality of pipes. The present invention also relates to a work vehicle equipped with the ROPS frame.

2. Description of the Related Art

JP 2009-280090 A discloses a work vehicle and a ROPS frame including bent pipes. Further, a relatively large work vehicle including front seats and back seats, for example, may be provided with a ROPS frame including a plurality of pipes coupled to one another.

There has been a demand in relation to a ROPS frame including a plurality of pipes for a weight reduction at a portion at which the respective ends of a pair of pipes face each other and are coupled to each other.

The present invention has an object of providing a ROPS frame for a work vehicle and a work vehicle with a reduced weight at a portion at which the respective ends of a pair of pipes face each other and are coupled to each other.

SUMMARY OF THE INVENTION

The present invention is a ROPS frame for a work vehicle, including: a plurality of pipes including: a first pipe having an end; and a second pipe having an end facing the end of the first pipe; a plate-shaped first joint coupled to the end of the first pipe and oriented orthogonally to a longitudinal direction of the pipes; a plate-shaped second joint coupled to the end of the second pipe and oriented orthogonally to the longitudinal direction of the pipes, the second joint being placed on the first joint; and a bolt extending through the first and second joints and fastening the first and second joints to each other.

The present invention is configured such that the first and second joints are placed on each other in such a manner that an end of the first pipe and an end of the second pipe face each other and that the first and second joints are provided with a bolt extending therethrough and fastening the first and second joints to each other. This allows the respective ends of the first and second pipes to be coupled to each other with use of the first and second joints.

The present invention includes plate-shaped first and second joints to simplify and reduce the weight of a portion at which the respective ends of the first and second pipes face each other and are coupled to each other.

The present invention is a ROPS frame for a work vehicle, including: a plurality of pipes including: a first pipe having an end; and a second pipe having an end facing the end of the first pipe; a plate-shaped first joint and a plate-shaped second joint each placed on an outer surface of the end of the first pipe and on an outer surface of the end of the second pipe and opposite to each other in a cross-sectional view of the pipes; a first collar attached to an inner portion of the first pipe which inner portion faces the first joint and to an inner portion of the first pipe which inner portion faces the second joint; a second collar attached to an inner portion of the second pipe which inner portion faces the first joint and to an inner portion of the second pipe which inner portion faces the second joint; a first bolt extending through the first and second joints and the first collar and fastening the first and second joints toward each other; and a second bolt extending through the first and second joints and the second collar and fastening the first and second joints toward each other.

The present invention is configured as follows: With an end of the first pipe facing an end of the second pipe, the first bolt extends through and fastens to one another the end of the first pipe, the first and second joints, and the first collar to couple the first and second joints to the end of the first pipe.

Further, the second bolt extends through and fastens to one another the end of the second pipe, the first and second joints, and the second collar to couple the first and second joints to the end of the second pipe.

The above configuration allows the respective ends of the first and second pipes to be coupled to each other with use of the first and second joints. Further, the first and second collars prevent the first and second pipes from buckling as a result of the fastening by the first and second bolts.

The present invention includes plate-shaped first and second joints to simplify and reduce the weight of a portion at which the respective ends of the first and second pipes face each other and are coupled to each other.

The present invention is a ROPS frame for a work vehicle, including: a plurality of pipes including: a first pipe having an end; and a second pipe having an end facing the end of the first pipe; a plate-shaped joint with: a first portion coupled to an inner surface of the end of the first pipe; and a second portion protruding from the end of the first pipe and disposed inside the end of the second pipe; a nut coupled to an inner surface of the second portion of the joint; and a bolt screwed in the nut from outward of the end of the second pipe and fastening the second pipe and the joint to each other.

The present invention is configured such that with an end of the first pipe facing an end of the second pipe, the joint is inserted in the end of the second pipe, and the bolt extends through and fastens to one another the end of the second pipe, the joint, and the nut. This allows the respective ends of the first and second pipes to be coupled to each other with use of the joint.

The present invention includes a plate-shaped joint to simplify and reduce the weight of a portion at which the respective ends of the first and second pipes face each other and are coupled to each other.

The present invention may preferably further includes: a first frame member oriented in a direction crossing the first and second pipes and having an end facing the respective ends of the first and second pipes; and a coupling member coupled to the end of the first pipe and the end of the first frame member and coupled to the end of the second pipe and the end of the first frame member.

A work vehicle may include a ROPS frame including first and second pipes with respective ends facing each other and coupled to each other. In such a case, the ROPS frame may include a first frame member that is oriented in a direction crossing the first and second pipes and that has an end facing the respective ends of the first and second pipes, and the first frame member may be coupled to the first and second pipes.

The above embodiment of the present invention includes a coupling member coupled to the end of the first pipe and the end of the first frame member and coupled to the end of the second pipe and the end of the first frame member.

The above configuration allows the respective ends of the first and second pipes and the end of the first frame member to be coupled to one another with use of the coupling member. This allows the ROPS frame to advantageously have an improved strength.

The present invention may preferably further includes: a second frame member oriented in a direction crossing the first and second pipes and the first frame member and having an end facing the respective ends of the first and second pipes, wherein the coupling member is further coupled to the end of the first pipe and the end of the second frame member and coupled to the end of the second pipe and the end of the second frame member.

A work vehicle may include a ROPS frame including first and second pipes and a first frame member coupled to one another as described above. In such a case, the ROPS frame may include a second frame member that is oriented in a direction crossing the first and second pipes and the first frame member and that has an end facing the respective ends of the first and second pipes and the end of the first frame member, and the second frame member may be coupled to the first and second pipes.

The above embodiment of the present invention is configured such that the coupling member is not only coupled to the respective ends of the first and second pipes and the end of the first frame member, but also coupled to the end of the first pipe and the end of the second frame member and coupled to the end of the second pipe and the end of the second frame member.

The above configuration allows the respective ends of the first and second pipes and the respective ends of the first and second frame members to be coupled to one another with use of the coupling member. This allows the ROPS frame to advantageously have an improved strength.

The above embodiment of the present invention is configured such that the coupling member functions not only to couple the respective ends of the first and second pipes and the end of the first frame member to one another, but also to couple the respective ends of the first and second pipes and the end of the second frame member to one another. This advantageously allows the coupling member to have a simple structure.

The present invention may preferably be arranged such that the end of the first frame member and the end of the second frame member are coupled to each other.

The above embodiment of the present invention not only allows the respective ends of the first and second pipes and the respective ends of the first and second frame members to be coupled to one another with use of the coupling member, but also allows the respective ends of the first and second frame members to be coupled to each other. This allows the ROPS frame to advantageously have an improved strength.

The present invention may preferably be arranged such that the coupling member is coupled to the end of the first pipe at a first coupling portion apart from a second coupling portion at which the coupling member is coupled to the end of the second pipe, and the respective ends of the first and second pipes face each other at a portion between the first coupling portion and the second coupling portion.

The above embodiment of the present invention is configured as follows: In a case where the coupling member is coupled to the respective ends of the first and second pipes, the coupling member is coupled to the end of the first pipe at a first coupling portion apart from a second coupling portion at which the coupling member is coupled to the end of the second pipe.

Further, the respective ends of the first and second pipes face each other at a portion between the first coupling portion and the second coupling portion. This simple configuration prevents contact between the coupling member and the portion at which the respective ends of the first and second pipes are coupled to each other.

The present invention may preferably be arranged such that the coupling member is coupled to the end of the first pipe with: the coupling member placed on an outer surface of the end of the first pipe; and a first auxiliary coupling member placed on the outer surface of the end of the first pipe and coupled to the coupling member, and the coupling member is coupled to the end of the second pipe with: the coupling member placed on an outer surface of the end of the second pipe; and a second auxiliary coupling member placed on the outer surface of the end of the second pipe and coupled to the coupling member.

The above embodiment of the present invention is configured such that the coupling member is coupled to the end of the first (second) pipe in such a manner that the coupling member and the first (second) auxiliary coupling member cover the end of the first (second) pipe.

The above configuration allows the coupling member to be coupled firmly to the end of the first (second) pipe regardless of the cross-sectional shape of the end of the first (second) pipe.

A work vehicle according to the present invention includes the ROPS frame.

The work vehicle according to the present invention, which includes a ROPS frame that is simple and lightweight as described above, is also lightweight accordingly.

DETAILED DESCRIPTION OF PREFERRED EMBODIMENTS

FIGS. 1 to 21 illustrate a multipurpose work vehicle provided with a roll-over protective structure (ROPS) frame 7 with joints 20 and 30. FIGS. 1 to 21 show "F" to indicate the forward direction, "B" to indicate the backward direction, "U" to indicate the upward direction, "D" to indicate the downward direction, "L" to indicate the leftward direction, and "R" to indicate the rightward direction.

Overall Configuration of Work Vehicle

Figure 1:
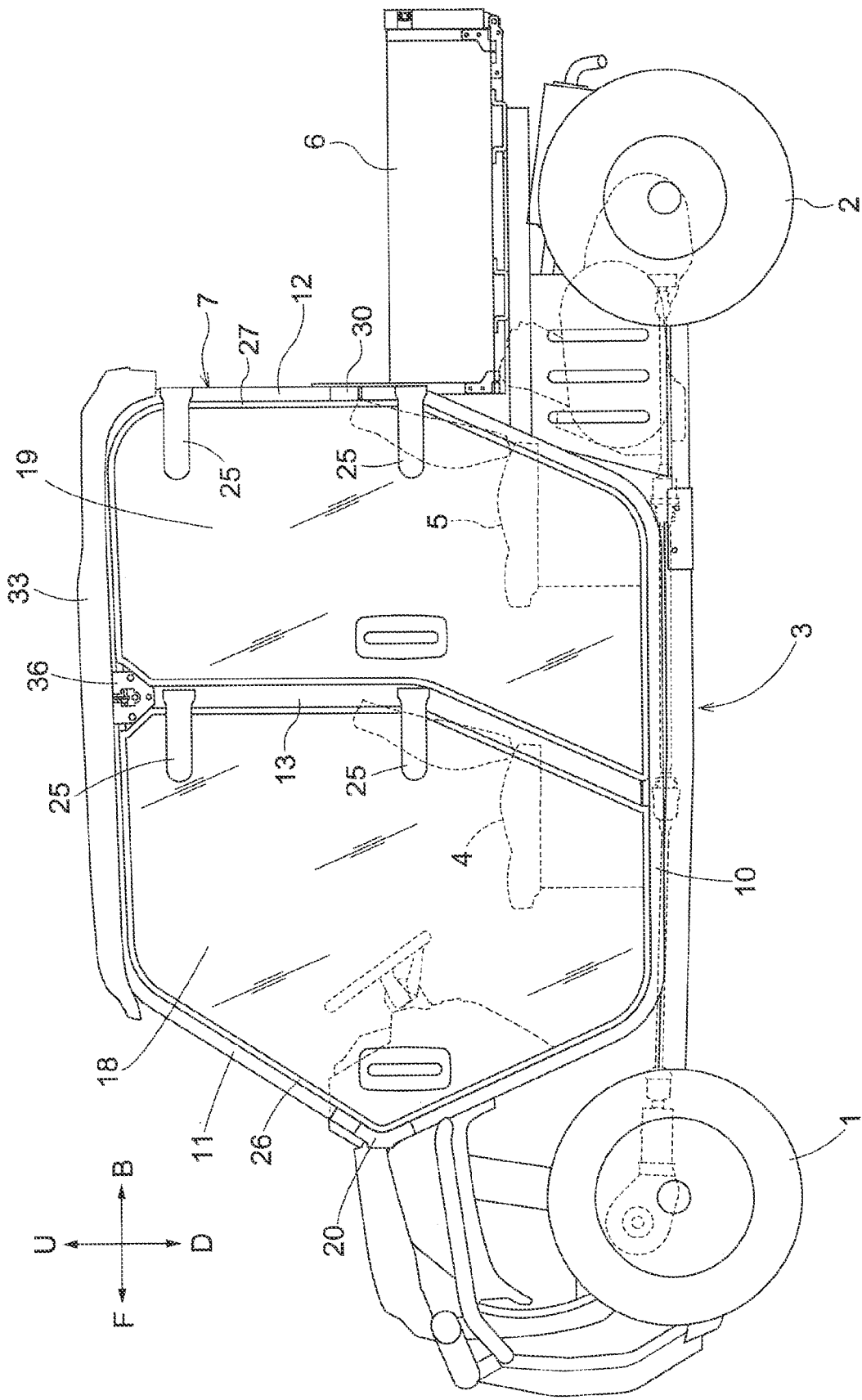
FIG. 1 is a left side view of a work vehicle.

As illustrated in FIG. 1, the work vehicle includes a pair of left and right front wheels 1, a pair of left and right rear wheels 2, and a body 3 supported by the front wheels 1 and the rear wheels 2. The body 3 is provided with a pair of left and right front seats 4, a pair of left and right back seats 5, and a carrier box 6 backward of the back seats 5.

The work vehicle includes a ROPS frame 7 enclosing the front seats 4 and the back seats 5. The work vehicle includes a windshield 8 (see FIG. 7) at a front portion of the ROPS frame 7, a rear glass window 9 (see FIG. 10) at a back portion of the ROPS frame 7, and a roof 33 at an upper portion of the ROPS frame 7. The work vehicle includes a pair of left and right front doors 18 respectively at left front and right front portions of the ROPS frame 7 and a pair of left and right rear doors 19 respectively at left back and right back portions of the ROPS frame 7.

Overall Configuration of ROPS Frame

As illustrated in FIGS. 1 to 4, the ROPS frame 7 includes a pair of left and right pipes 10 each in the shape of a channel in a side view, a pair of left and right pipes 11 each angled in a side view, a pair of left and right pipes 12 each angled in a side view, a pair of left and right frame members 13, and a frame member 14.

The ROPS frame 7 includes (i) a pair of left and right front joints 20 each coupling the front upper end of the corresponding pipe 10 to the front lower end of the corresponding pipe 11, (ii) a frame member 15 extending between and coupled to the front joints 20, and (iii) a plate-shaped frame member 17 extending between and coupled to the pipes 11.

The ROPS frame 7 includes a pair of left and right rear joints 30 each coupling the back upper end of the corresponding pipe 10 to the back lower end of the corresponding pipe 12. The pipes 11 each have a back upper end coupled to the front upper end of the corresponding pipe 12. The ROPS frame 7 includes (i) a frame member 16 and a plate-shaped frame member 23 each extending between and coupled to the pipes 12 and (ii) a pair of left and right handles 24 coupled to the respective pipes 12 and designed for use by a person to get in and out of the work vehicle.

The frame members 13 each extend in the up-down direction to be coupled to (i) an intermediate portion of the corresponding pipe 10 in the front-back direction and (ii) that portion at which the back upper end of the corresponding pipe 11 is coupled to the front upper end of the corresponding pipe 12. The ROPS frame 7 includes a pair of left and right handles 24 coupled to the respective pipes 13 and designed for use by a person to get in and out of the work vehicle.

The frame member 14 extends in the left-right direction to be coupled to (i) that portion at which the back upper end of the right pipe 11 is coupled to the front upper end of the right pipe 12 and (ii) that portion at which the back upper end of the left pipe 11 is coupled to the front upper end of the left pipe 12.

The windshield 8 (see FIG. 7) is attached to and surrounded by the pipes 11 and the frame members 15 and 17. The rear glass window 9 (see FIG. 10) is attached to the frame member 23 in such a manner as to be capable of being opened and closed in the front-back direction.

The front doors 18 are each attached to the corresponding frame member 13 with use of hinges 25 in such a manner as to be capable of being opened and closed. The rear doors 19 are each attached to the corresponding pipes 10 and 12 with use of hinges 25 in such a manner as to be capable of being opened and closed.

The ROPS frame 7, as described above, includes pipes 10, 11, and 12 and frame members 13 to 17 and 23. The pipes 10 are coupled to the body 3.

Cross-Sectional Shapes of Pipes

As illustrated in FIGS. 2, 3, 14, and 15, each pipe 11 has a pair of sealing surfaces 11a and 11b each angled in cross section and opposite to each other in a cross-sectional view.

Each pipe 11 also has a pair of non-sealing surfaces 11c and 11d opposite to each other in a cross-sectional view and each disposed between the sealing surfaces 11a and 11b. The sealing surfaces 11a and 11b and the non-sealing surfaces 11c and 11d extend along the entire length of the pipe 11.

As illustrated in FIGS. 2 and 7 to 9, each pipe 10 has a pair of sealing surfaces 10a and 10b and a pair of non-sealing surfaces 10c and 10d similarly to the pipes 11. The sealing surfaces 10a and 10b and the non-sealing surfaces 10c and 10d extend along the entire length of the pipe 10. The pipes 10 each have a cross-sectional shape identical to that of each pipe 11 (see FIGS. 14 and 15).

As illustrated in FIGS. 2, 3, 14, and 15, each pipe 12 has a pair of sealing surfaces 12a and 12b and a pair of non-sealing surfaces 12c and 12d similarly to the pipes 11. The sealing surfaces 12a and 12b and the non-sealing surfaces 12c and 12d extend along the entire length of the pipe 12. The pipes 12 each have a cross-sectional shape identical to that of each pipe 11 (see FIGS. 14 and 15).

Figure 2:
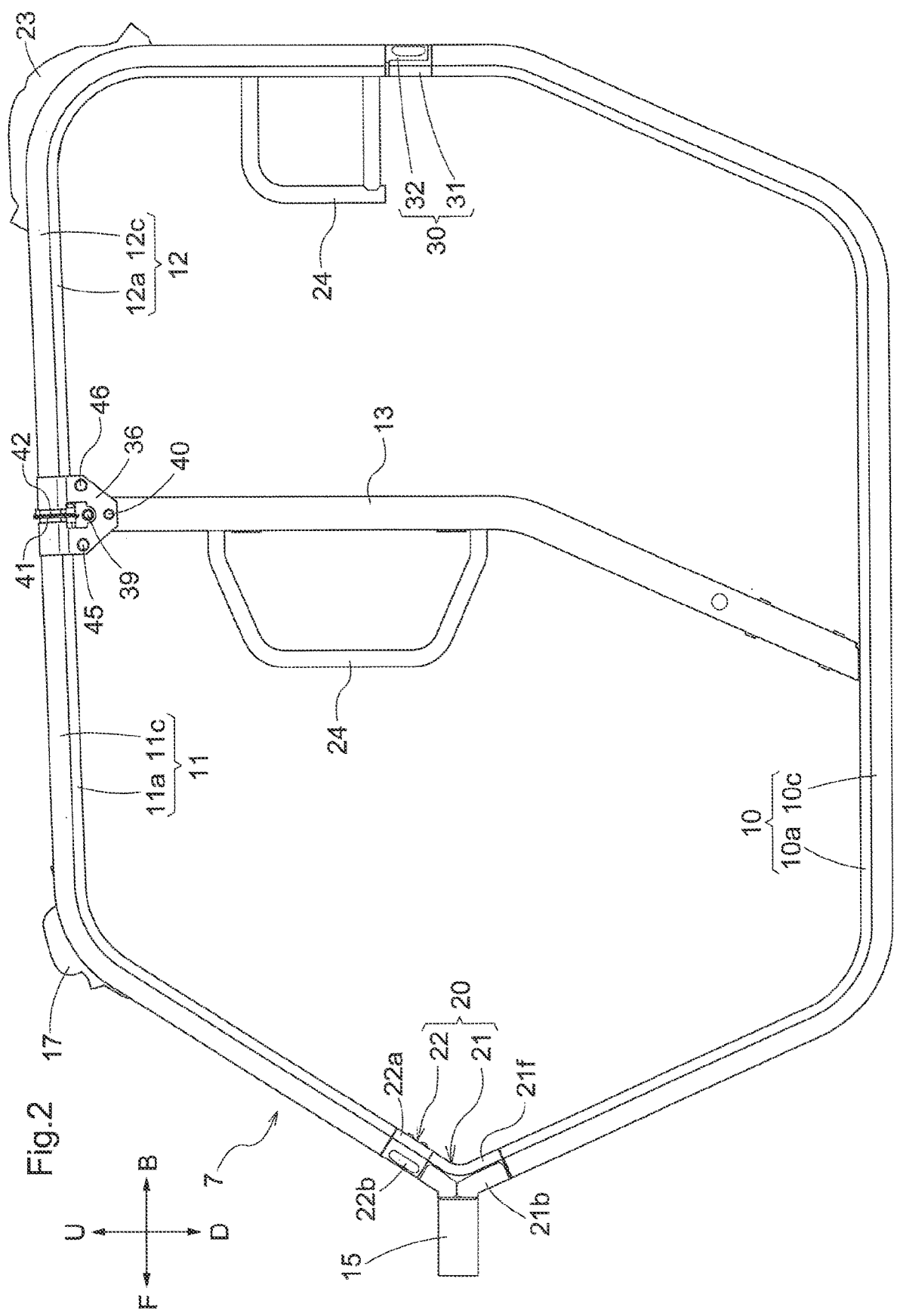
FIG. 2 is a left side view of a ROPS frame.
Figure 3:
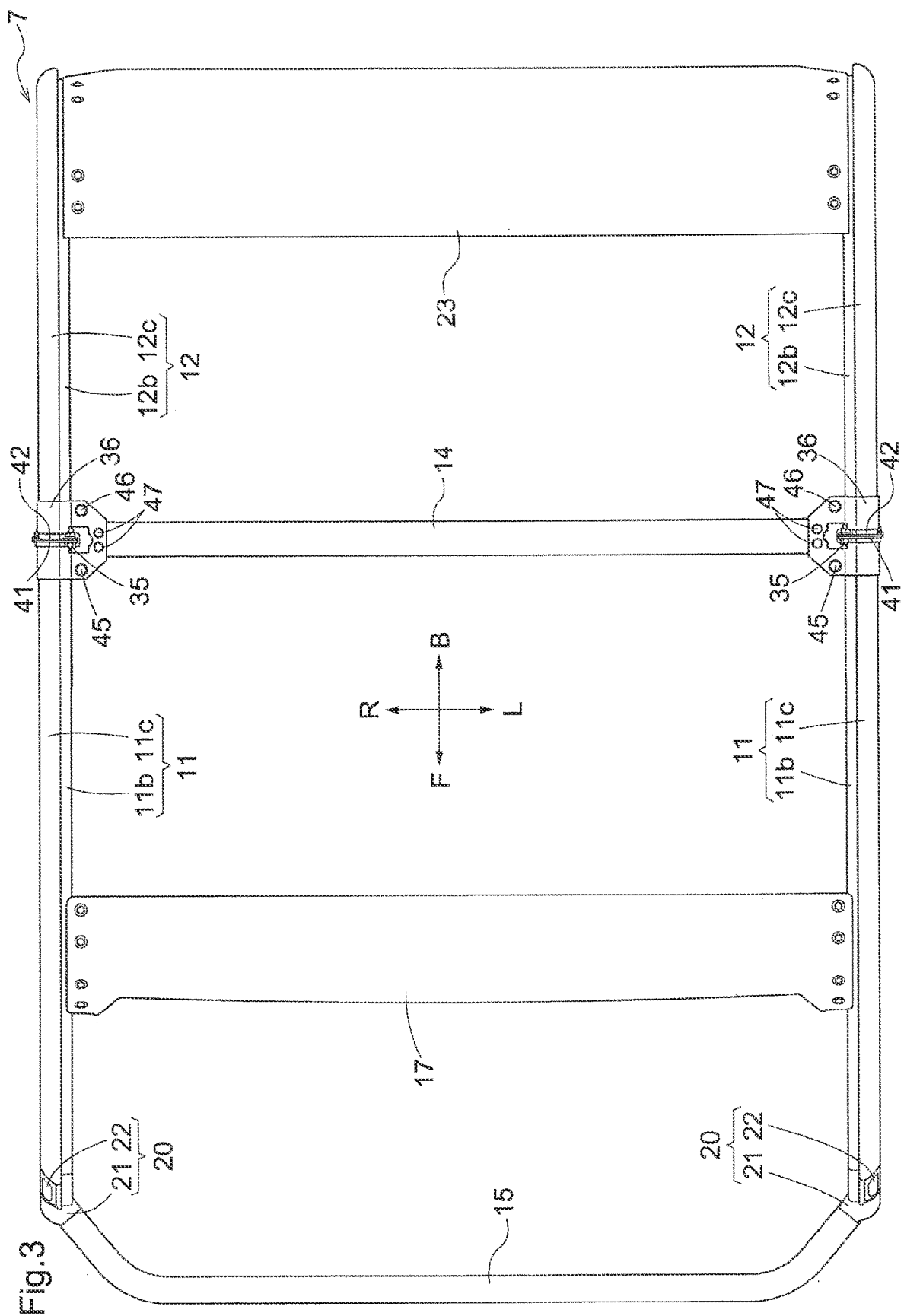
FIG. 3 is a plan view of a ROPS frame.
Figure 4:
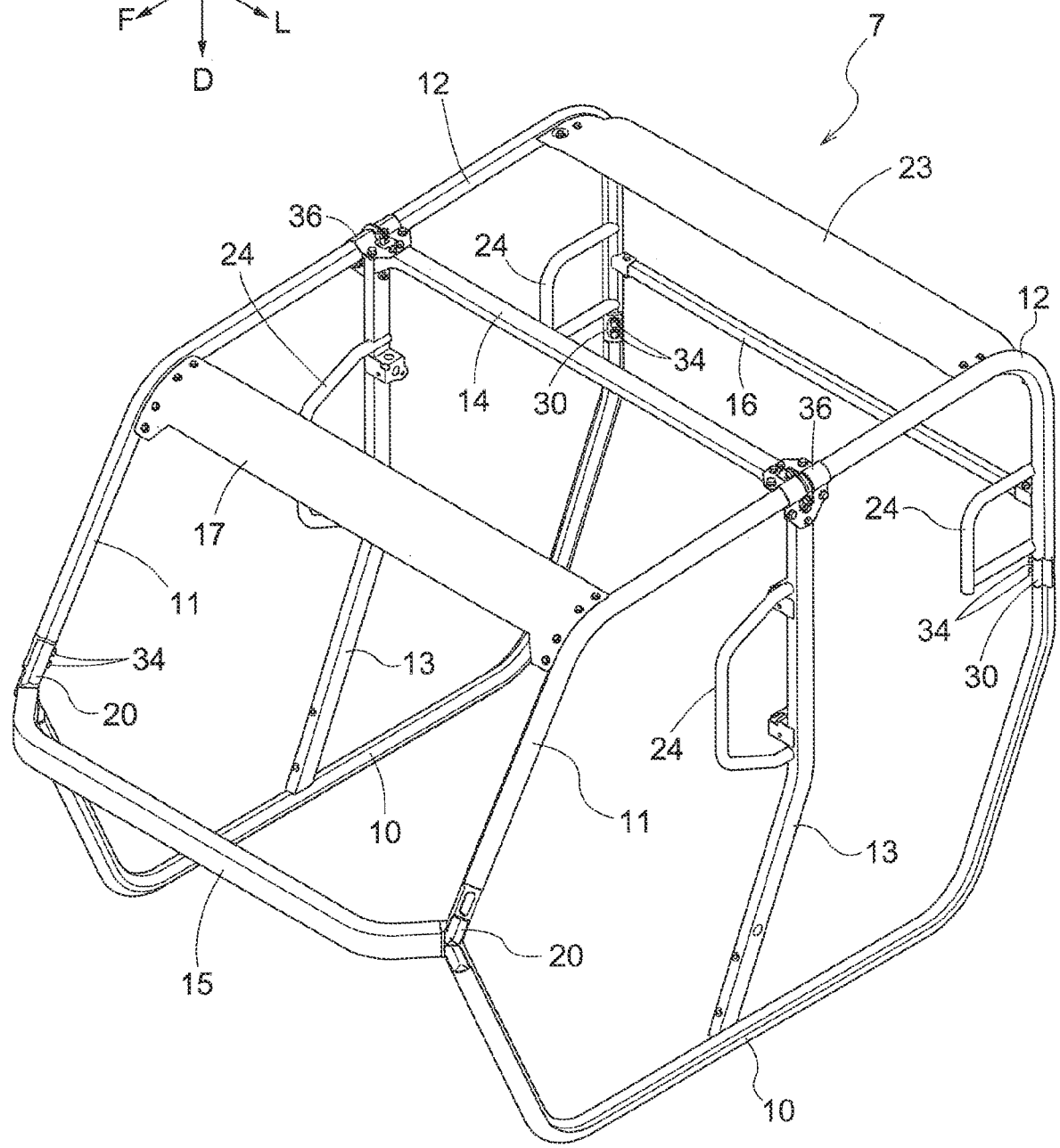
FIG. 4 is a perspective view of a ROPS frame.

As illustrated in FIGS. 2, 3, and 4, the frame members 13, 15, and 16 each have a rectangular cross section, while the frame member 14 has a channel-shaped cross section.

How Pipes are Related to Windshield, Front Doors, and Rear Doors

Figure 5:
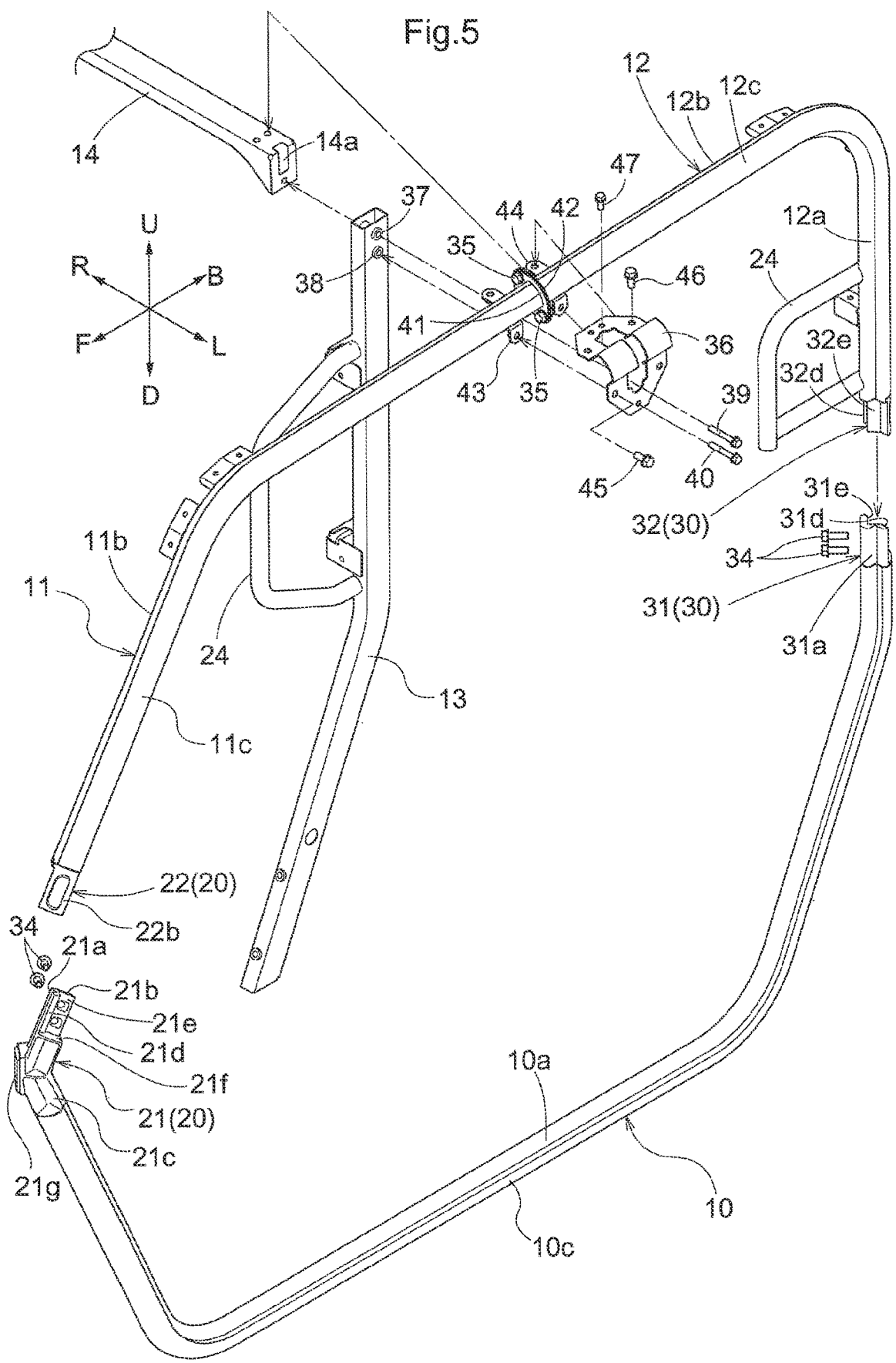
FIG. 5 is an exploded perspective view of a left-side portion of a ROPS frame.
Figure 6:
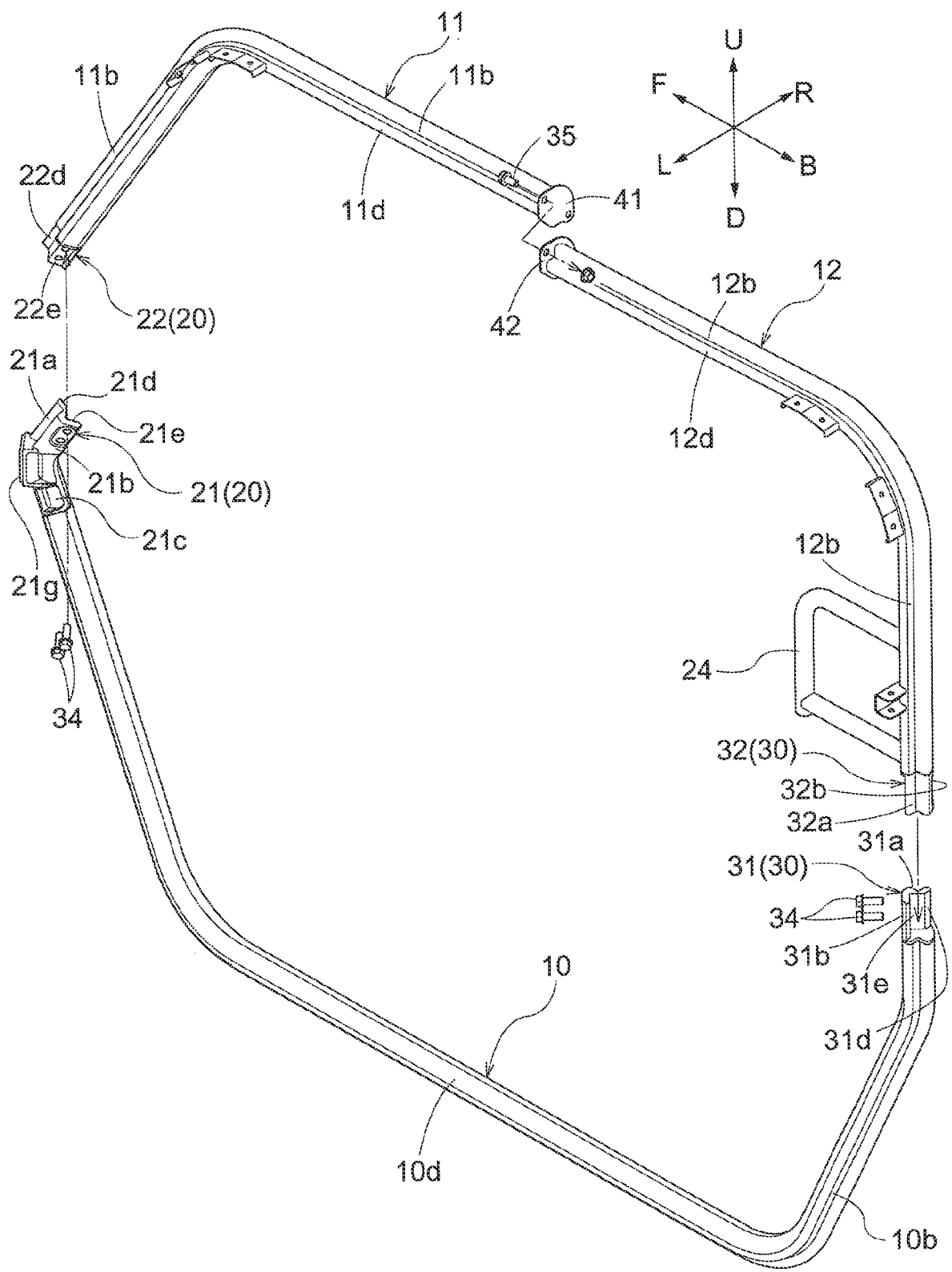
FIG. 6 is an exploded perspective view of a right-side portion of a ROPS frame.

As illustrated in FIGS. 2, 5, and 6, the ROPS frame 7 is configured such that the respective sealing surfaces 10a, 11a, and 12a of the pipes 10, 11, and 12 on each side are continuous with one another and face outward.

Figure 7:
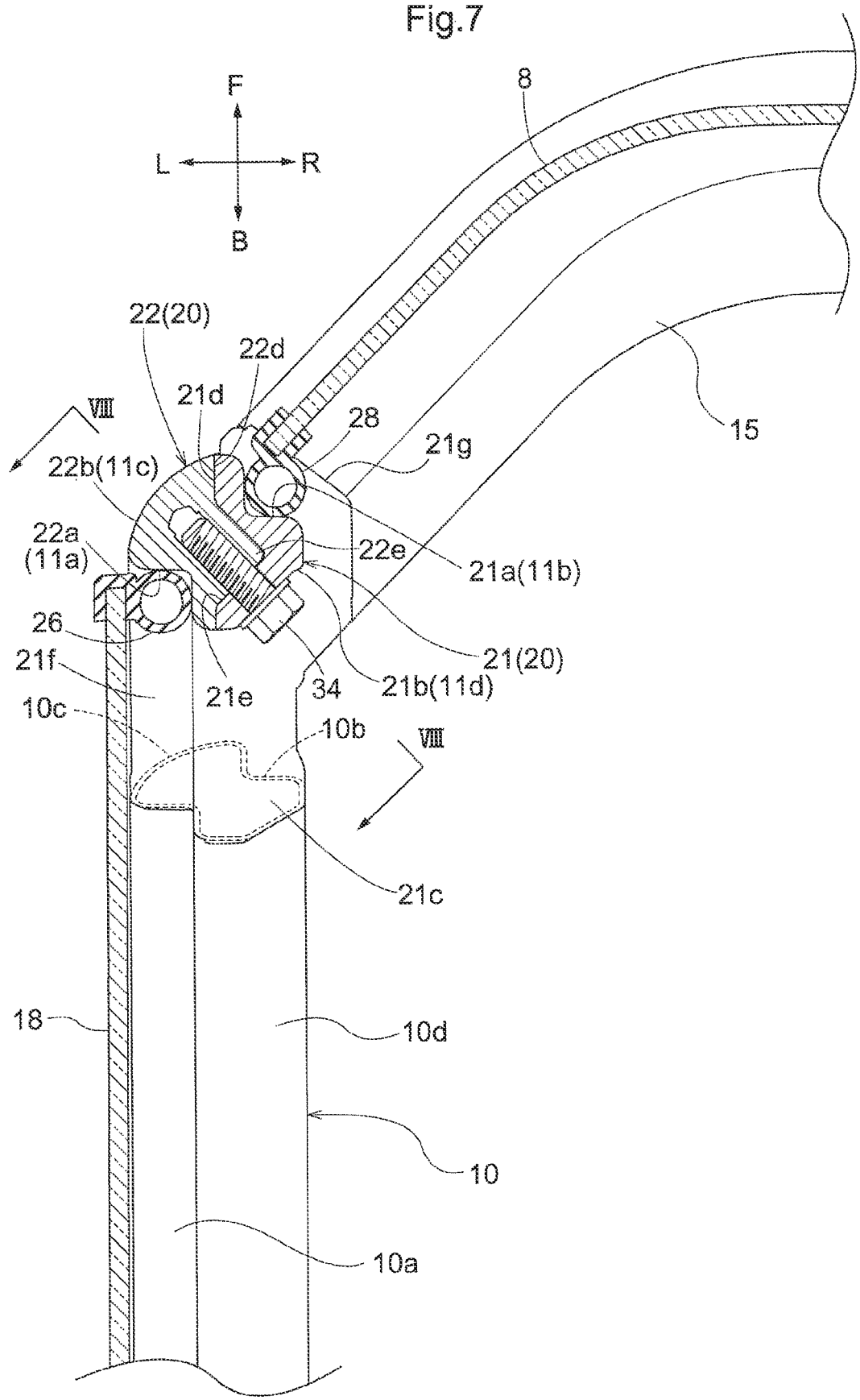
FIG. 7 is a plan cross-sectional view of a left-side front joint and its nearby portion of a ROPS frame.

As illustrated in FIGS. 1 and 7, each front door 18 has an outer edge provided with a rubber sealer 26 attached thereto. Closing the front door 18 brings the sealer 26 into contact with the respective sealing surfaces 10a and 11a of the corresponding pipes 10 and 11 and the corresponding frame member 13 (see FIG. 4).

Figure 10:
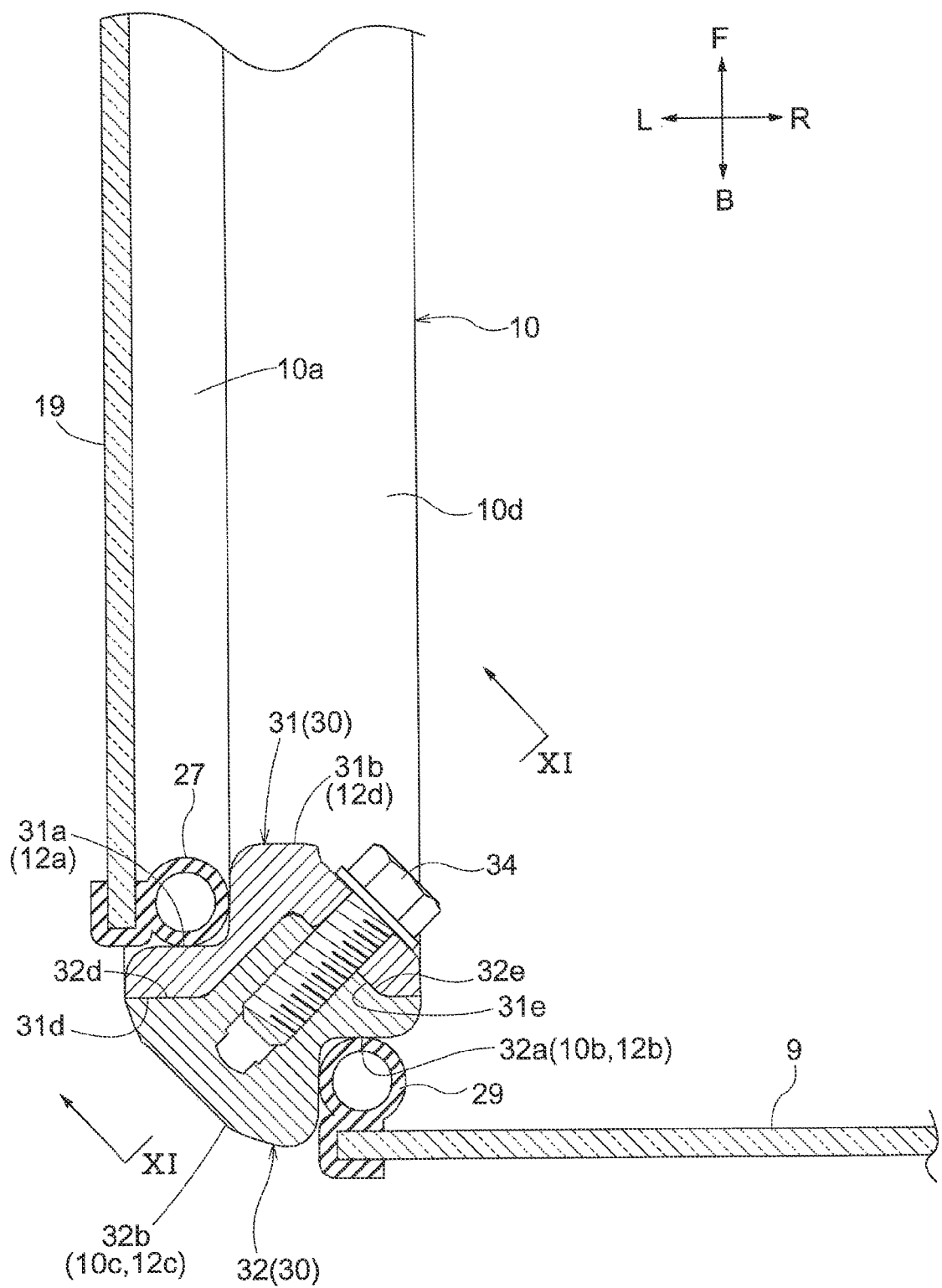
FIG. 10 is a plan cross-sectional view of a left-side rear joint and its nearby portion of a ROPS frame.

As illustrated in FIGS. 1 and 10, each rear door 19 has an outer edge provided with a rubber sealer 27 attached thereto. Closing the rear door 19 brings the sealer 27 into contact with the respective sealing surfaces 10a and 12a of the corresponding pipes 10 and 12 and the corresponding frame member 13 (see FIG. 4).

As illustrated in FIGS. 5 and 7, the windshield 8 has an outer edge provided with a rubber sealer 28 attached thereto. The windshield 8 is attached to and surrounded by the pipes 11 and the frame members 15 and 17 in such a manner that the sealer 28 is in contact with the respective sealing surfaces 11b of the pipes 11 and the frame members 15 and 17 (see FIG. 4).

As illustrated in FIGS. 6 and 10, the rear glass window 9 has an outer edge provided with a rubber sealer 29 attached thereto. Closing the rear glass window 9 brings the sealer 29 into contact with the respective sealing surfaces 10b and 12b of the pipes 10 and 12 on each side and the frame member 23 (see FIG. 4).

The roof 33 (see FIG. 1) has an outer edge provided with a rubber sealer (not shown in the drawings) attached thereto. As illustrated in FIGS. 5 and 6, the roof 33 is attached to and disposed between the pipes 11 and 12 in such a manner that the sealer is in contact with the respective sealing surfaces 11b of the pipes 11 and the respective sealing surfaces 12b of the pipes 12.

Configuration of Front Joints

As illustrated in FIGS. 1 to 4, each front joint 20, which couples the front upper end of the corresponding pipe 10 to the front lower end of the corresponding pipe 11, includes a first coupling section 21 and a second coupling section 22.

As illustrated in FIGS. 5 to 9, the first coupling section 21 includes a first sealing portion 21a and a first non-sealing portion 21b. The first coupling section 21 also has, between the first sealing portion 21a and the first non-sealing portion 21b, a first contact surface 21d with a depression 21e. The first coupling section 21 includes a coupling portion 21c with a bent shape in a side view. The coupling portion 21c includes a third sealing portion 21f, a third non-sealing portion 21h, and an attachment portion 21g.

The second coupling section 22 includes a second sealing portion 22a, a second non-sealing portion 22b, and a coupling portion 22c. The second coupling section 22 has, between the second sealing portion 22a and the second non-sealing portion 22b, a second contact surface 22d with a protrusion 22e.

As illustrated in FIG. 7, placing the first coupling section 21 and the second coupling section 22 on each other brings the first contact surface 21d into contact with the second coupling section 22 and the second contact surface 22d into contact with the first coupling section 21. The protrusion 22e, which is at the second contact surface 22d, is triangular in cross section and protrudes toward the first contact surface 21d in a cross-sectional view.

The depression 21e, which is at the first contact surface 21d, is triangular in cross section and receives the protrusion 22e in a cross-sectional view. The depression 21e is a portion of the first contact surface 21d which portion is depressed toward the first non-sealing portion 21b in a cross-sectional view.

Coupling of Front Joints

As illustrated in FIGS. 5 to 9, the coupling portion 21c is coupled to the front upper end of the corresponding pipe 10 as a first pipe; the attachment portion 21g is coupled to the frame member 15; and the coupling portion 22c is coupled to the front lower end of the corresponding pipe 11 as a second pipe.

With the first coupling section 21 coupled to the corresponding pipe 10, the first non-sealing portion 21b is continuous with the non-sealing surface 10d of the pair of non-sealing surfaces 10c and 10d of the pipe 10; the third sealing portion 21f of is continuous with the sealing surface 10a of the pair of sealing surfaces 10a and 10b of the pipe 10; and the third non-sealing portion 21h is continuous with the non-sealing surface 10c of the pair of non-sealing surfaces 10c and 10d of the pipe 10.

With the second coupling section 22 coupled to the corresponding pipe 11, the second sealing portion 22a is continuous with the sealing surface 11a of the pair of sealing surfaces 11a and 11b of the pipe 11; and the second non-sealing portion 22b is continuous with the non-sealing surface 11c of the pair of non-sealing surfaces 11c and 11d of the pipe 11.

Figure 8:
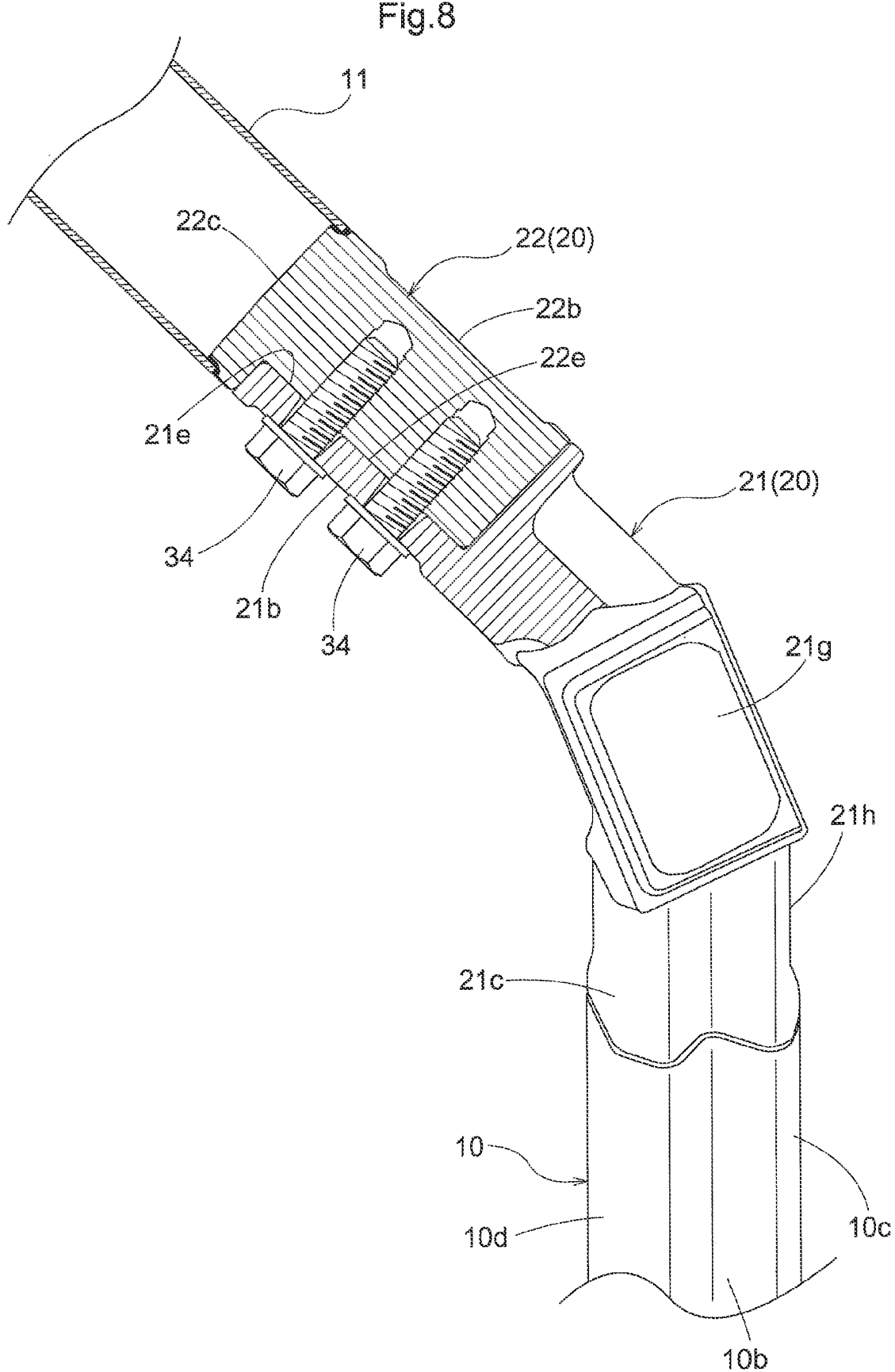
FIG. 8 is a cross-sectional view of the left-side front joint and its nearby portion in FIG. 7 taken along line VIII-VIII in FIG. 7.
Figure 9:
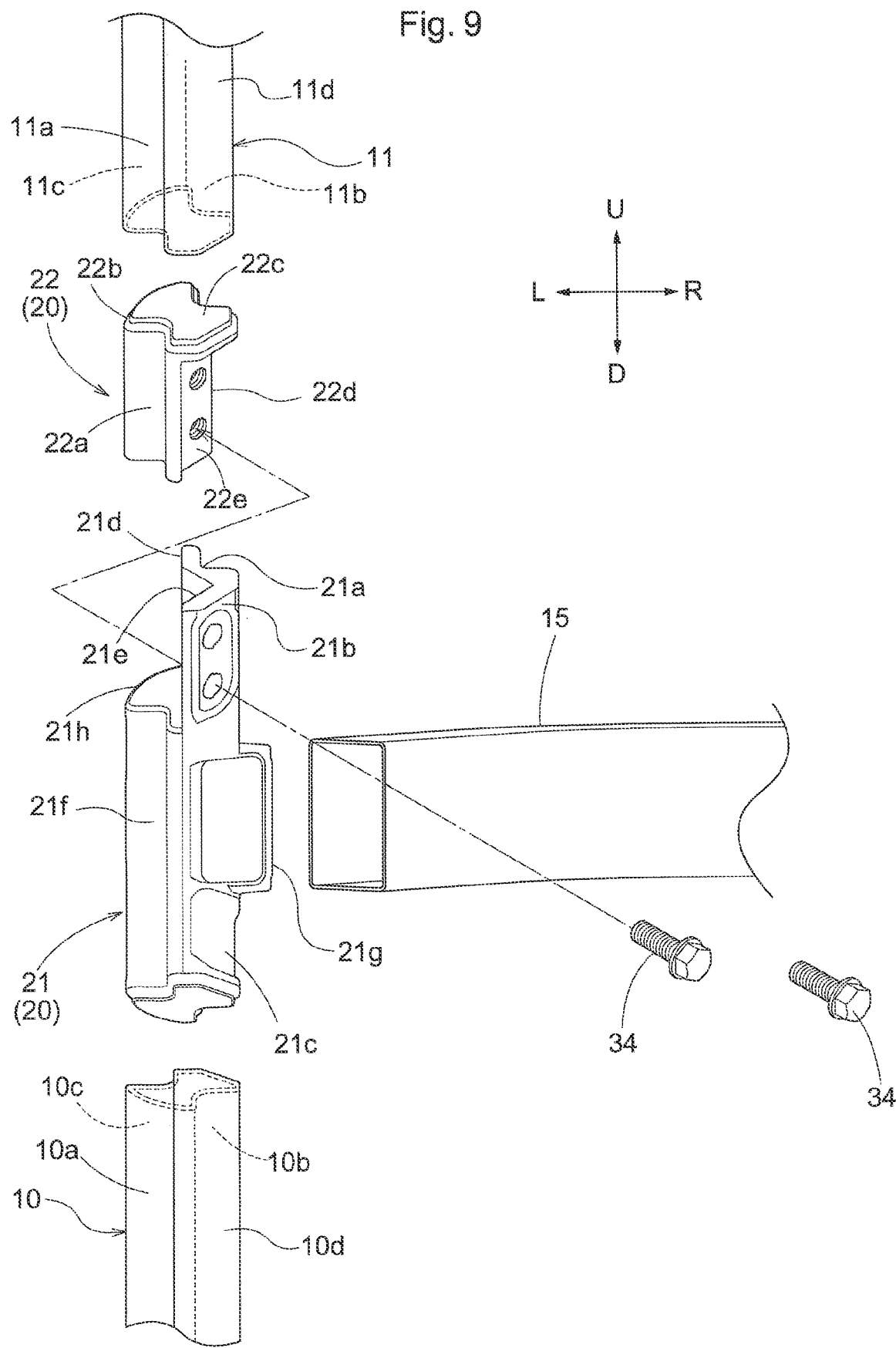
FIG. 9 is an exploded perspective view of a left-side front joint and its nearby portion of a ROPS frame.

With the first coupling section 21 of each joint 20 coupled to the corresponding pipe 10 and the second coupling section 22 thereof coupled to the corresponding pipe 11 as described under "Configuration of Front Joints" above, the first coupling section 21 (specifically, the first contact surface 21d) and the second coupling section 22 (specifically, the second contact surface 22d) are placed on each other as illustrated in FIGS. 7 and 8.

With the first coupling section 21 and the second coupling section 22 placed on each other, the protrusion 22e is in the depression 21e. The first coupling section 21 and the second coupling section 22 are coupled to each other with use of bolts 34.

In a cross-sectional view, the bolts 34 in the above state each extend through the protrusion 22e and the depression 21e, obliquely cross the first contact surface 21d and the second contact surface 22d, and are each in contact with the first non-sealing portion 21b and the second non-sealing portion 22b.

As described above, the joints 20 are each configured such that coupling the first coupling section 21 and the second coupling section 22 to each other results in the pipes 10 and 11 being coupled to each other with use of the joint 20 (namely, the first coupling section 21 and the second coupling section 22) in such a manner that the front upper end and the front lower end face each other.

Positional Relationships Between Front Joints and Pipes

As illustrated in FIGS. 5 to 7 and 9, with the first coupling section 21 and the second coupling section 22 of each joint 20 coupled to each other, the first coupling section 21, the second coupling section 22, and the corresponding pipes 10 and 11 are positionally related to one another as described below.

With the first coupling section 21 coupled to the second coupling section 22, the third sealing portion 21f is continuous with the second sealing portion 22a.

As described under "Coupling of Front Joints" above, the third sealing portion 21f is continuous with the sealing surface 10a of the pair of sealing surfaces 10a and 10b of the corresponding pipe 10; and the second sealing portion 22a is continuous with the sealing surface 11a of the pair of sealing surfaces 11a and 11b of the corresponding pipe 11.

This allows the sealing surface 10a of the pipe 10 to be continuous with the sealing surface 11a of the pipe 11 with use of the third sealing portion 21f and the second sealing portion 22a.

As described under "How Pipes Are Related to Windshield, Front Doors, and Rear Doors" above, closing each front door 18 brings the sealer 26 into contact with the respective sealing surfaces 10a and 11a of the corresponding pipes 10 and 11 and the outer surface of the corresponding frame member 13. In this state, the sealer 26 is also in contact with the third sealing portion 21f and the second sealing portion 22a.

Coupling the first coupling section 21 to the second coupling section 22 results in the first sealing portion 21a being continuous with the sealing surface 11b of the pair of sealing surfaces 11a and 11b of the corresponding pipe 11.

When the sealer 28 of the windshield 8 is in contact with the respective sealing surfaces 11b of the pipes 11 as described under "How Pipes Are Related to Windshield, Front Doors, and Rear Doors" above, the sealer 28 is also in contact with the first sealing portion 21a.

With the first coupling section 21 coupled to the second coupling section 22, the third non-sealing portion 21h is continuous with the second non-sealing portion 22b.

As described under "Coupling of Front Joints" above, the first non-sealing portion 21b is continuous with the non-sealing surface 10d of the pair of non-sealing surfaces 10c and 10d of the corresponding pipe 10; the third non-sealing portion 21h is continuous with the non-sealing surface 10c of the pair of non-sealing surfaces 10c and 10d of the pipe 10; and the second non-sealing portion 22b is continuous with the non-sealing surface 11c of the pair of non-sealing surfaces 11c and 11d of the pipe 11.

This allows the non-sealing surface 10c of the pipe 10 to be continuous with the non-sealing surface 11c of the pipe 11 with use of the third non-sealing portion 21h and the second non-sealing portion 22b, and also allows the non-sealing surface 10d of the pipe 10 to be continuous with the non-sealing surface 11d of the pipe 11 with use of the first non-sealing portion 21b.

Configuration of Rear Joints

As illustrated in FIGS. 1 to 4, each rear joint 30, which couples the back upper end of the corresponding pipe 10 to the back lower end of the corresponding pipe 12, includes a first coupling section 31 and a second coupling section 32.

As illustrated in FIGS. 5, 6, and 10 to 12, the first coupling section 31 includes a first sealing portion 31a, a first non-sealing portion 31b, and a coupling portion 31c. The first coupling section 31 also has, between the first sealing portion 31a and the first non-sealing portion 31b, a first contact surface 31d with a depression 31e.

The second coupling section 32 includes a second sealing portion 32a, a second non-sealing portion 32b, and a coupling portion 32c. The second coupling section 32 has, between the second sealing portion 32a and the second non-sealing portion 32b, a second contact surface 32d with a protrusion 32e.

As illustrated in FIG. 10, placing the first coupling section 31 and the second coupling section 32 on each other brings the first contact surface 31d into contact with the second coupling section 32 and the second contact surface 32d into contact with the first coupling section 31. The protrusion 32e, which is at the second contact surface 32d, is triangular in cross section and protrudes toward the first contact surface 31d in a cross-sectional view.

The depression 31e, which is at the first contact surface 31d, is triangular in cross section and receives the protrusion 32e in a cross-sectional view. The depression 31e is a portion of the first contact surface 31d which portion is depressed toward the first non-sealing portion 31b in a cross-sectional view.

Coupling of Rear Joints

As illustrated in FIGS. 5, 6, and 10 to 12, the coupling portion 31c is coupled to the back upper end of the corresponding pipe 10 as a first pipe; and the coupling portion 32c is coupled to the back lower end of the corresponding pipe 12 as a second pipe.

With the first coupling section 31 coupled to the corresponding pipe 10, the first sealing portion 31a is continuous with the sealing surface 10a of the pair of sealing surfaces 10a and 10b of the pipe 10; and the first non-sealing portion 31b is continuous with the non-sealing surface 10d of the pair of non-sealing surfaces 10c and 10d of the pipe 10.

With the second coupling section 32 coupled to the corresponding pipe 12, the second sealing portion 32a is continuous with the sealing surface 12b of the pair of sealing surfaces 12a and 12b of the pipe 12; and the second non-sealing portion 32b is continuous with the non-sealing surface 12c of the pair of non-sealing surfaces 12c and 12d of the pipe 12.

Figure 11:
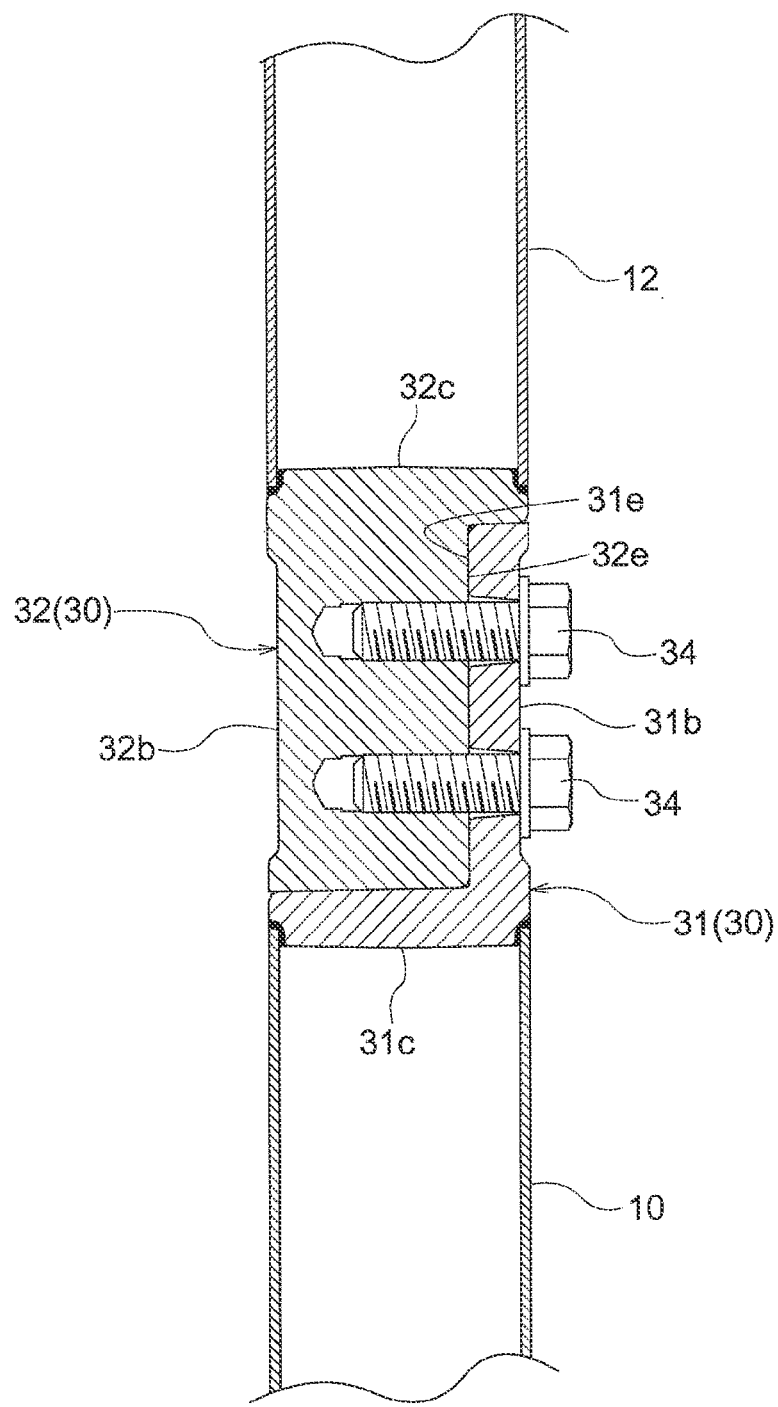
FIG. 11 is a cross-sectional view of the left-side rear joint and its nearby portion in FIG. 10 taken along line XI-XI in FIG. 10.
Figure 12:
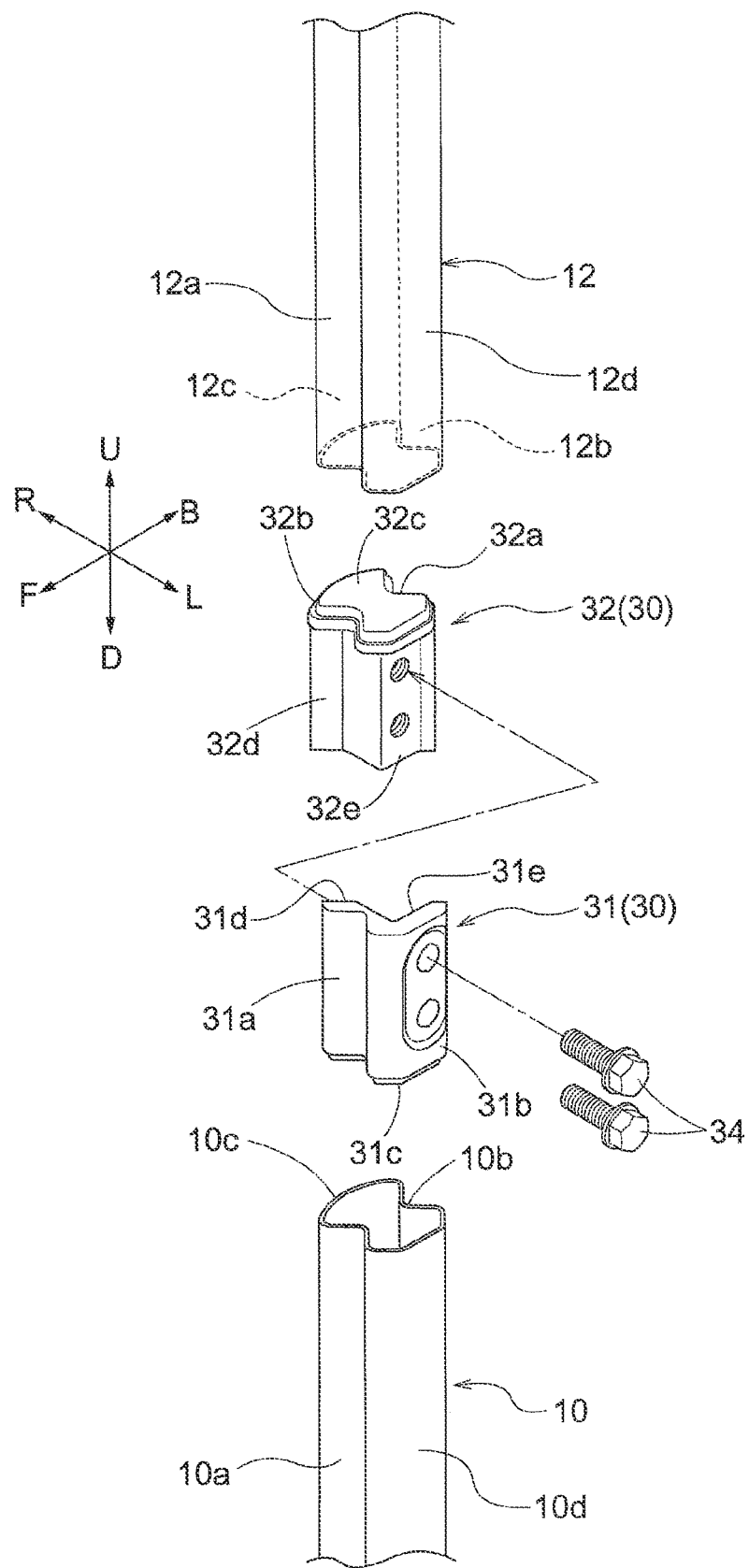
FIG. 12 is an exploded perspective view of a right-side rear joint and its nearby portion of a ROPS frame.
Figure 13:
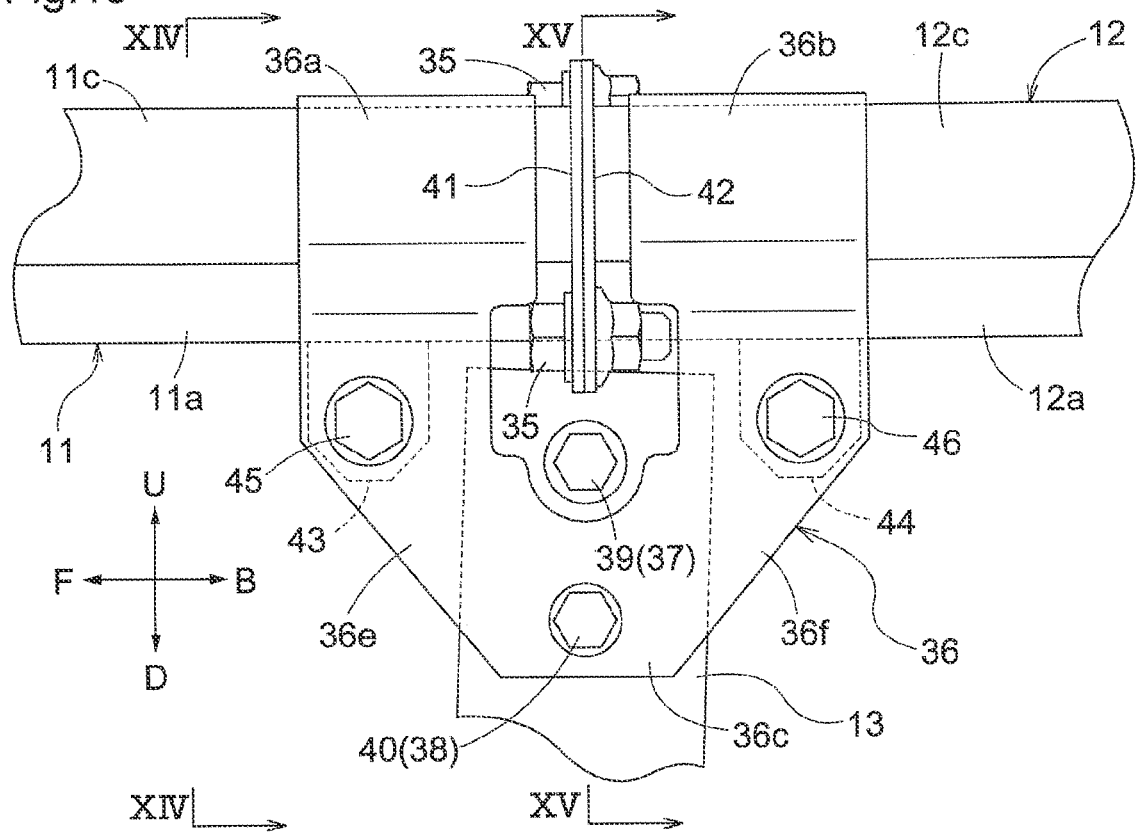
FIG. 13 is a left side view of a portion and its nearby portion of a ROPS frame at which the back upper end of a left pipe is coupled to the front upper end of another left pipe.

With the first coupling section 31 of each joint 30 coupled to the corresponding pipe 10 and the second coupling section 32 thereof coupled to the corresponding pipe 12 as described under "Configuration of Rear Joints" above, the first coupling section 31 (specifically, the first contact surface 31d) and the second coupling section 32 (specifically, the second contact surface 32d) are placed on each other as illustrated in FIGS. 10 and 11.

With the first coupling section 31 and the second coupling section 32 placed on each other, the protrusion 32e is in the depression 31e. The first coupling section 31 and the second coupling section 32 are coupled to each other with use of bolts 34.

In a cross-sectional view, the bolts 34 in the above state each extend through the protrusion 32e and the depression 31e, obliquely cross the first contact surface 31d and the second contact surface 32d, and are each in contact with the first non-sealing portion 31b and the second non-sealing portion 32b.

As described above, the joints 30 are each configured such that coupling the first coupling section 31 and the second coupling section 32 to each other results in the pipes 10 and 12 being coupled to each other with use of the joint 30 (namely, the first coupling section 31 and the second coupling section 32) in such a manner that the back upper end and the back lower end face each other.

Positional Relationships Between Rear Joints and Pipes

As illustrated in FIGS. 5, 6, 10, and 12, with the first coupling section 31 and the second coupling section 32 of each joint 30 coupled to each other, the first coupling section 31, the second coupling section 32, and the corresponding pipes 10 and 12 are positionally related to one another as described below.

Coupling the first coupling section 31 to the second coupling section 32 results in the first sealing portion 31a being continuous with the sealing surface 12a of the pair of sealing surfaces 12a and 12b of the corresponding pipe 12.

As described under "Coupling of Rear Joints" above, the first sealing portion 31a is continuous with the sealing surface 10a of the pair of sealing surfaces 10a and 10b of the corresponding pipe 10.

This allows the sealing surface 10a of the pipe 10 to be continuous with the sealing surface 12a of the corresponding pipe 12 with use of the first sealing portion 31a.

When, as a result of closing each rear door 19, the sealer 27 thereof is in contact with the respective sealing surfaces 10a and 12a of the corresponding pipes 10 and 12 as described under "How Pipes Are Related to Windshield, Front Doors, and Rear Doors" above, the sealer 27 is also in contact with the first sealing portion 31a.

Coupling the first coupling section 31 to the second coupling section 32 results in the second sealing portion 32a being continuous with the sealing surface 10b of the pair of sealing surfaces 10a and 10b of the corresponding pipe 10.

As described under "Coupling of Rear Joints" above, the second sealing portion 32a is continuous with the sealing surface 12b of the pair of sealing surfaces 12a and 12b of the corresponding pipe 12.

This allows the sealing surface 10b of the corresponding pipe 10 to be continuous with the sealing surface 12b of the pipe 12 with use of the second sealing portion 32a.

When, as a result of closing rear glass window 9, the sealer 29 thereof is in contact with the respective sealing surfaces 10b and 12b of the pipes 10 and 12 on each side as described under "How Pipes Are Related to Windshield, Front Doors, and Rear Doors" above, the sealer 29 is also in contact with the second sealing portion 32a.

Coupling the first coupling section 31 to the second coupling section 32 results in (i) the first non-sealing portion 31b being continuous with the non-sealing surface 12d of the corresponding pipe 12 and (ii) the second non-sealing portion 32b being continuous with the non-sealing surface 10c of the corresponding pipe 10.

As described under "Coupling of Rear Joints" above, the first non-sealing portion 31b is continuous with the non-sealing surface 10d of the pair of non-sealing surfaces 10c and 10d of the corresponding pipe 10; and the second non-sealing portion 32b is continuous with the non-sealing surface 12c of the pair of non-sealing surfaces 12c and 12d of the corresponding pipe 12.

This allows the non-sealing surface 10c of the pipe 10 to be continuous with the non-sealing surface 12c of the pipe 12 with use of the second non-sealing portion 32b, and also allows the non-sealing surface 10d of the pipe 10 to be continuous with the non-sealing surface 12d of the pipe 12 with use of the first non-sealing portion 31b of the first coupling section 31.

How Pipes and Frame Members of ROPS Frame are Structurally Coupled

The description below deals with that portion at which are coupled to one another (i) the back upper end of each pipe 11 as a first pipe (on the left side as an example; similar descriptions apply also to the right side), (ii) the front upper end of the corresponding pipe 12 as a second pipe", (iii) the upper end of the corresponding frame member 13 as a first frame member, and (iv) the corresponding end of the frame member 14 as a second frame member.

As illustrated in FIGS. 2, 3, 5, 6, and 13 to 16, the ROPS frame 7 includes a plate-shaped first joint 41 and a plate-shaped second joint 42. The first joint 41 is welded to the back upper end of the pipe 11 and oriented orthogonally to the longitudinal direction of the upper portion of the pipe 11. The second joint 42 is welded to the front upper end of the pipe 12 and oriented orthogonally to the longitudinal direction of the upper portion of the pipe 12.

The first and second joints 41 and 42 are placed on each other in such a manner that the back upper end of the pipe 11 and the front upper end of the pipe 12 face each other. The first and second joints 41 and 42 are provided with bolts 35 extending therethrough and fastening the first and second joints 41 and 42 to each other. The back upper end of the pipe 11 and the front upper end of the pipe 12 are thereby coupled to each other with use of the first and second joints 41 and 42 and the bolts 35.

The frame member 13 extends in the up-down direction, which crosses the respective upper portions of the pipes 11 and 12. The frame member 13 has an upper end facing the back upper end of the pipe 11 and the front upper end of the pipe 12.

The frame member 14 extends in the left-right direction, which crosses the respective upper portions of the pipes 11 and 12 and the upper portion of the frame member 13. The frame member 14 has a left (right) end facing the back upper end of the pipe 11 and the front upper end of the pipe 12.

The ROPS frame 7 includes a coupling member 36 (see FIG. 17) coupling to one another (i) the back upper end of the pipe 11, (ii) the front upper end of the pipe 12, (iii) the upper end of the frame member 13, and (iv) the left (right) end of the frame member 14 as described under "Structure of Coupling Member", "Coupling with Use of Coupling Member", and "Coupling of Coupling Member" below.

Structure of Coupling Member

Figure 17:
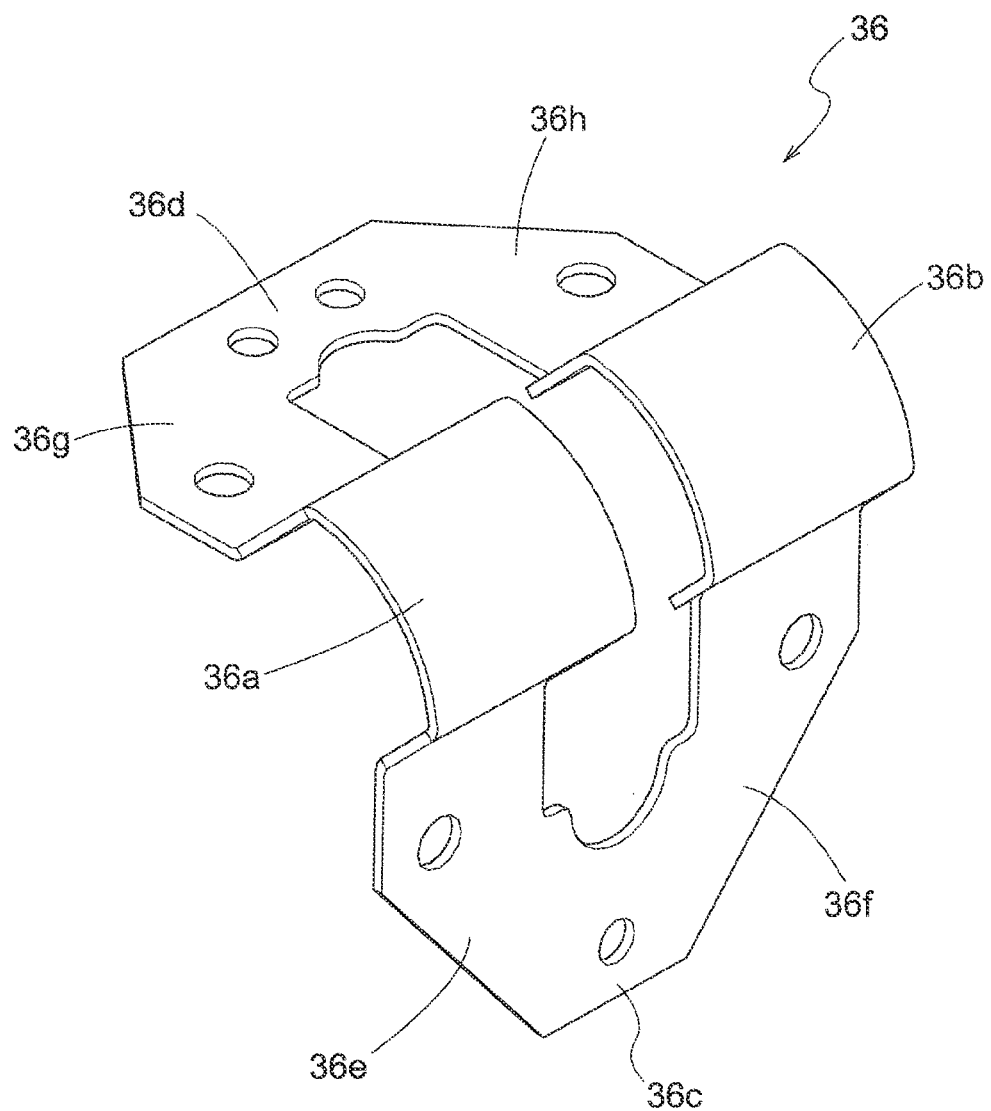
FIG. 17 is a perspective view of a coupling member.

As illustrated in FIG. 17, the coupling member 36 is in the form of a bent plate. The coupling member 36 includes four coupling sections 36a, 36b, 36c, and 36d and four connection sections 36e, 36f, 36g, and 36h. The connection section 36e extends between the coupling sections 36a and 36c. The connection section 36f extends between the coupling sections 36b and 36c. The connection section 36g extends between the coupling sections 36a and 36d. The connection section 36h extends between the coupling sections 36b and 36d.

The coupling member 36 is configured such that the coupling sections 36a and 36b are each bent in the shape of a depression and are apart from each other with a space in-between and that the connection sections 36e and 36g are apart from the connection sections 36f and 36h with a space in-between.

Coupling with Use of Coupling Member

As illustrated in FIGS. 13 to 17, the upper end of the frame member 13 is provided with a pair of collars 37 and 38 welded thereto, while the left (right) end of the frame member 14 is coupled to the collar 37 with use of a bolt 39. This results in coupling between the upper end of the frame member 13 and the left (right) end of the frame member 14.

The ROPS frame 7 includes a first auxiliary coupling member 43 and a second auxiliary coupling member 44 each in the form of a bent plate. The first auxiliary coupling member 43 is welded to the back upper end of the pipe 11, while the second auxiliary coupling member 44 is welded to the front upper end of the pipe 12.

The connection section 36c is coupled to the collar 38 with use of a bolt 40 to thereby be coupled to the upper end of the frame member 13. The connection section 36d is coupled to the left (right) end of the frame member 14 with use of bolts 47.

With the back upper end of the pipe 11 fitted in the connection section 36a, the coupling section 36a and the first auxiliary coupling member 43 are provided with a bolt 45 extending therethrough and fastening the connection section 36a to the first auxiliary coupling member 43. This results in the back upper end of the pipe 11 being coupled to the connection section 36a.

With the front upper end of the pipe 12 fitted in the connection section 36b, the coupling section 36b and the second auxiliary coupling member 44 are provided with a bolt 46 extending therethrough and fastening the connection section 36b to the second auxiliary coupling member 44. This results in the front upper end of the pipe 12 being coupled to the connection section 36b.

The coupling sections 36a and 36b are coupled respectively to the back upper end of the pipe 11 and to the front upper end of the pipe 12 in such a manner that the coupling section 36a and the first auxiliary coupling member 43 cover the back upper end of the pipe 11 and that the coupling section 36b and the second auxiliary coupling member 44 cover the front upper end of the pipe 12.

The first auxiliary coupling member 43 and the second auxiliary coupling member 44 may alternatively be uncoupled respectively from the back upper end of the pipe 11 and from the front upper end of the pipe 12.

Coupling of Coupling Member

As described under "Structure of Coupling Member" and "Coupling with Use of Coupling Member" above and illustrated in FIGS. 13 to 17, the coupling sections 36a and 36c and the connection section 36e are coupled to the back upper end of the pipe 11 and the upper end of the frame member 13; and the coupling sections 36b and 36c and the connection section 36f are coupled to the front upper end of the pipe 12 and the upper end of the frame member 13.

Further, the coupling sections 36a and 36d and the connection section 36g are coupled to the back upper end of the pipe 11 and the left (right) end of the frame member 14; and the coupling sections 36b and 36d and the connection section 36h are coupled to the front upper end of the pipe 12 and the left (right) end of the frame member 14.

As described under "Structure of Coupling Member" above, the coupling member 36 is configured such that the coupling sections 36a and 36b are apart from each other and that the connection sections 36e and 36g are apart from the connection sections 36f and 36h. The left (right) end of the frame member 14 has an opening 14a (see FIG. 5).

The back upper end of the pipe 11 and the front upper end of the pipe 12 face each other at a portion (in other words, the first and second joints 41 and 42 and the bolts 35) that is (i) between the coupling sections 36a and 36b, (ii) between the connection sections 36e and 36g and the connection sections 36f and 36h, and (iii) in the opening 14a.

First Alternative Embodiment

The back upper end of the pipe 11 and the front upper end of the pipe 12 may be structurally coupled to each other with use of the first and second joints 41 and 42 as described below.

Figure 18:
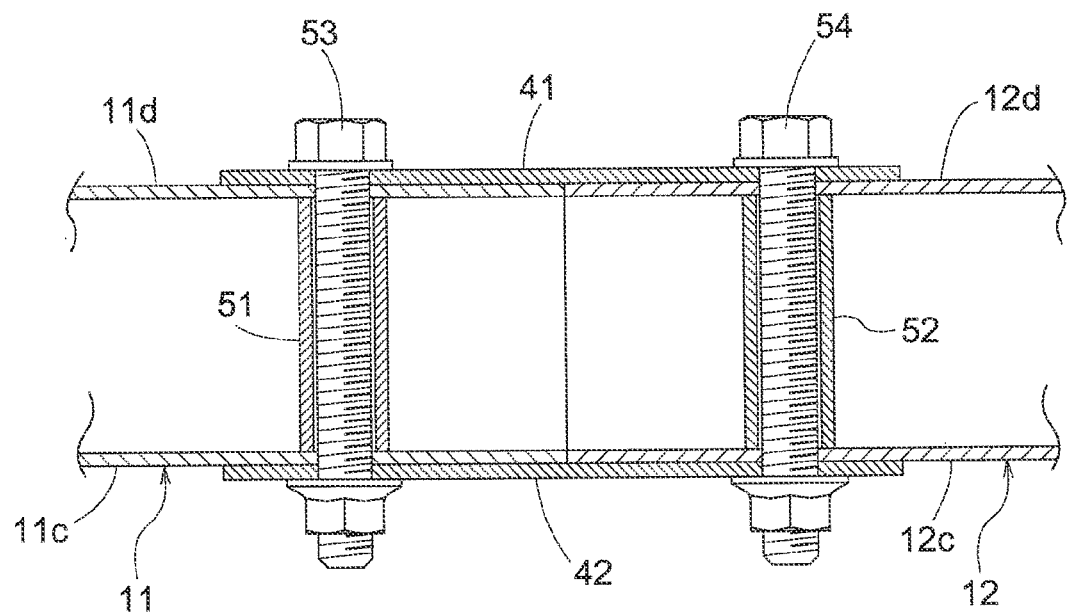
FIG. 18 is a side cross-sectional view of a portion and its nearby portion of a ROPS frame as a first alternative embodiment at which the back upper end of a pipe is coupled to the front upper end of another pipe.

As illustrated in FIG. 18, this embodiment includes a plate-shaped first joint 41 that is, with the back upper end of the pipe 11 facing the front upper end of the pipe 12, placed on the non-sealing surface 11d (outer surface) of the back upper end of the pipe 11 and the non-sealing surface 12d (outer surface) of the front upper end of the pipe 12.

This embodiment also includes a plate-shaped second joint 42 placed on the non-sealing surface 11c (outer surface) of the back upper end of the pipe 11 and the non-sealing surface 12c (outer surface) of the front upper end of the pipe 12. The first and second joints 41 and 42 are opposite to each other in a cross-sectional view of the pipes 11 and 12.

This embodiment includes a first collar 51 that has a cylindrical shape, that is inside the back upper end of the pipe 11, and that is attached to that portion of the non-sealing surface 11d which faces the first joint 41 and to that portion of the non-sealing surface 11c which faces the second joint 42.

This embodiment includes a second collar 52 that has a cylindrical shape, that is inside the front upper end of the pipe 12, and that is attached to that portion of the non-sealing surface 12d which faces the first joint 41 and to that portion of the non-sealing surface 12c which faces the second joint 42.

This embodiment includes a first bolt 53 extending through the first and second joints 41 and 42 and the first collar 51 and fastening the first and second joints 41 and 42 toward each other.

This embodiment includes a second bolt 54 extending through the first and second joints 41 and 42 and the second collar 52 and fastening the first and second joints 41 and 42 toward each other.

The above configuration allows the back upper end of the pipe 11 and the front upper end of the pipe 12 to be coupled to each other with use of the first and second joints 41 and 42 and the first and second bolts 53 and 54.

Figure 14:
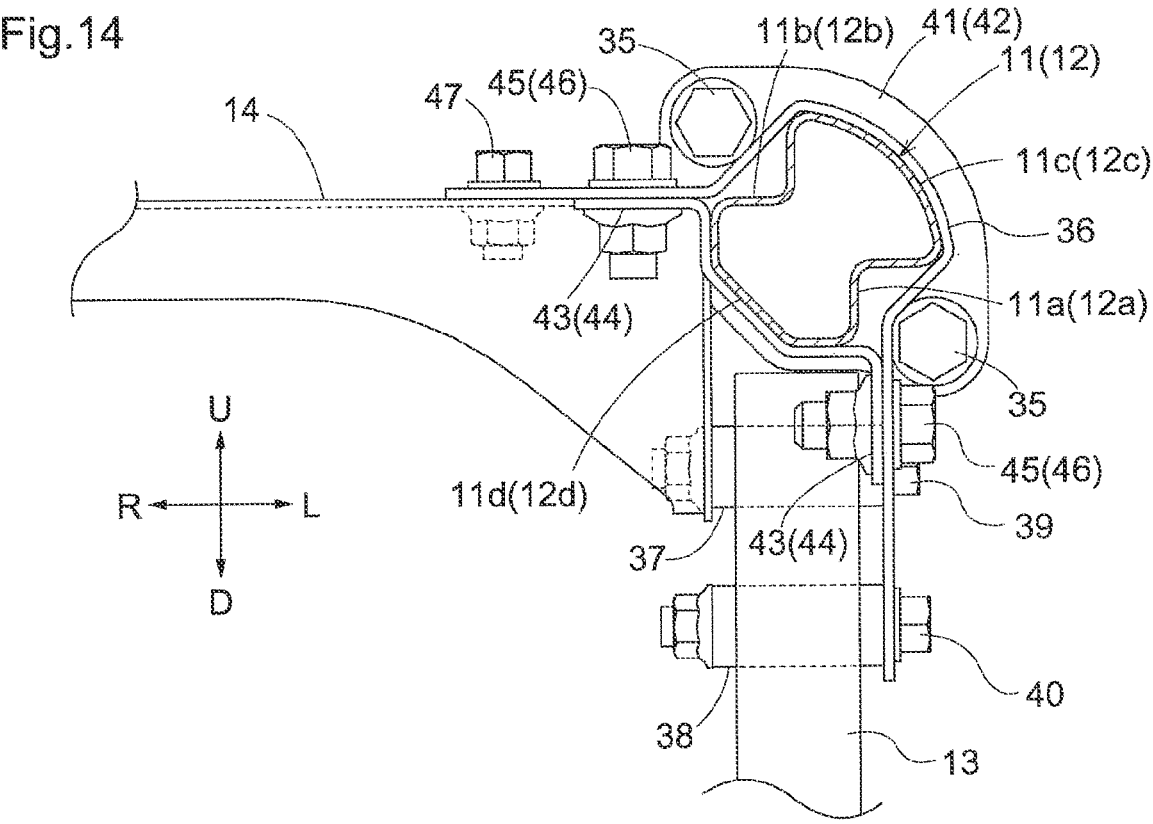
FIG. 14 is a cross-sectional view of the portion and its nearby portion in FIG. 13 taken along line XIV-XIV in FIG. 13.
Figure 15:
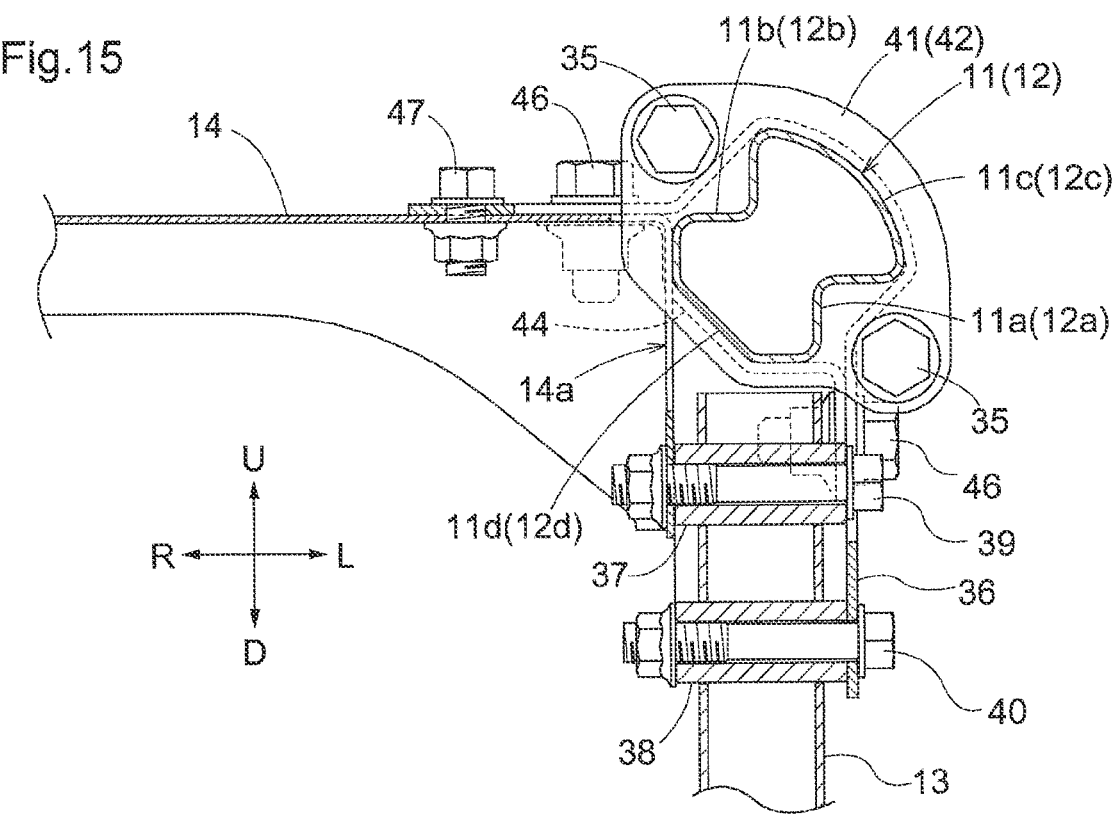
FIG. 15 is a cross-sectional view of the portion and its nearby portion in FIG. 13 taken along line XV-XV in FIG. 13.
Figure 16:
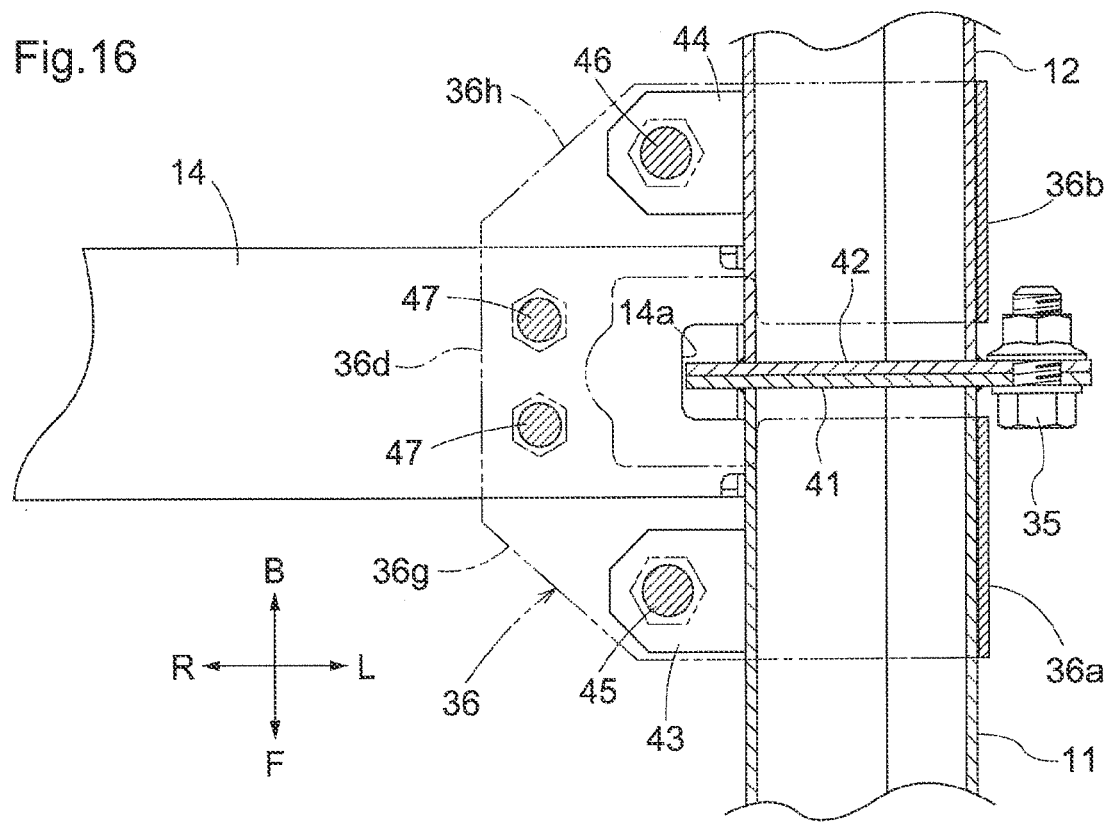
FIG. 16 is a plan cross-sectional view of a portion and its nearby portion of a ROPS frame at which the back upper end of a left pipe is coupled to the front upper end of another left pipe.

In a case where the pipes 11 and 12 each have a circular cross-sectional shape unlike in FIGS. 14 and 15, the first and second joints 41 and 42 may together be a cylinder. With this configuration, the cylinder has a portion as the first joint 41 and another portion as the second joint 42 that is shifted in phase by 180 degrees from the first joint 41.

Second Alternative Embodiment

This embodiment is configured as described under "First Alternative Embodiment" above and illustrated in FIG. 18, and includes frame members 13 and 14 illustrated in FIGS. 13 to 16 as described below.

Figure 19:
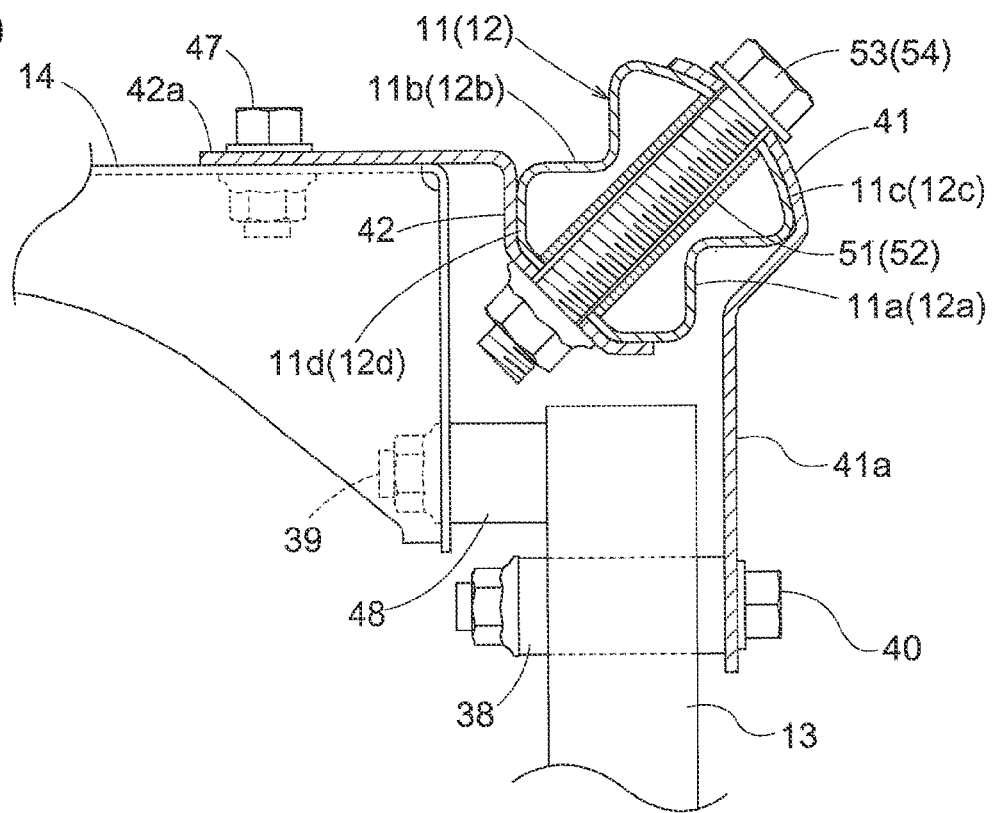
FIG. 19 is a front cross-sectional view of a portion and its nearby portion of a ROPS frame as a second alternative embodiment at which the back upper end of a pipe is coupled to the front upper end of another pipe.

As illustrated in FIG. 19, this embodiment is configured such that the first joint 41 includes a coupling section 41a extending therefrom downward and coupled to the collar 38 (hence to the frame member 13) with use of a bolt 40 and that the second joint 42 includes a coupling section 42a extending therefrom laterally and coupled to the frame member 14 with use of bolts 47.

The frame member 13 is not provided with the collar 37 illustrated in FIGS. 14 and 15, and is provided with an internally threaded boss 48 welded to the upper end thereof. The frame member 14 is coupled to the boss 48 (hence to the frame member 13) with use of a bolt 39.

This configuration allows the first and second joints 41 and 42 to perform the function of the coupling member 36 illustrated in FIGS. 13 to 17, thereby eliminating the need to includes a separate coupling member 36.

Third Alternative Embodiment

The back upper end of the pipe 11 and the front upper end of the pipe 12 may be structurally coupled to each other with use of the first and second joints 41 and 42 as described below.

Figure 20:
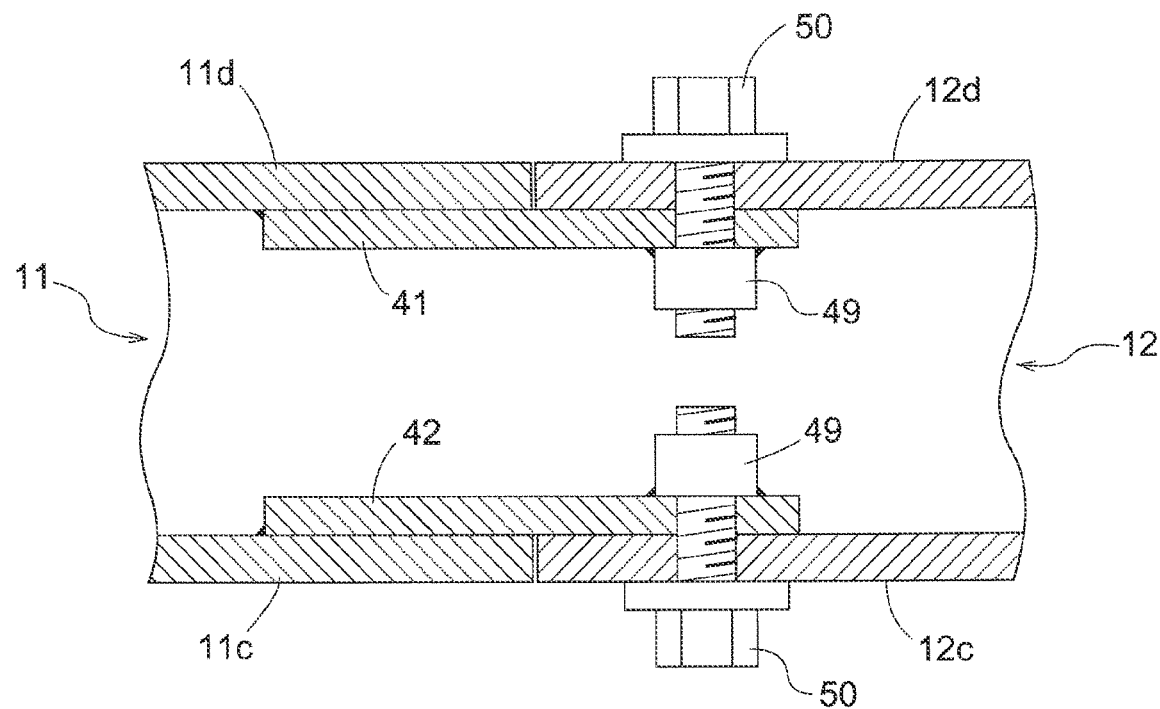
FIG. 20 is a side cross-sectional view of a portion and its nearby portion of a ROPS frame as a third alternative embodiment at which the back upper end of a pipe is coupled to the front upper end of another pipe.

As illustrated in FIG. 20, this embodiment includes a plate-shaped first joint 41 with a first portion welded to the inner surface (non-sealing surface 11d) of the back upper end of the pipe 11 and a second portion protruding from the back upper end of the pipe 11. This embodiment also includes a nut 49 welded to the inner surface of the second portion of the first joint 41.

This embodiment includes a plate-shaped second joint 42 with a first portion welded to the inner surface (non-sealing surface 11c) of the back upper end of the pipe 11 and a second portion protruding from the back upper end of the pipe 11. This embodiment also includes a nut 49 welded to the inner surface of the second portion of the second joint 42. The first and second joints 41 and 42 are opposite to each other in a cross-sectional view of the pipes 11 and 12.

The respective second portions of the first and second joints 41 and 42 are inserted in the front upper end of the pipe 12, so that the back upper end of the pipe 11 and the front upper end of the pipe 12 face each other. This embodiment includes two bolts 50 screwed in the respective nuts 49 on the first and second joints 41 and 42 from outward of the front upper end of the pipe 12 and fastening the pipe 12 to the first and second joints 41 and 42.

The above configuration allows the back upper end of the pipe 11 and the front upper end of the pipe 12 to be coupled to each other with use of the first and second joints 41 and 42, the bolts 50, and the nuts 49.

Fourth Alternative Embodiment

This embodiment is configured as described under "Third Alternative Embodiment" above and illustrated in FIG. 20, and is altered such that the first and second joints 41 and 42 have respective first portions each welded to the inner surfaces (non-sealing surfaces 12d and 12c) of the front upper end of the pipe 12 and respective second portions each protruding from the front upper end of the pipe 12. With this configuration, the pipe 12 serves as the first pipe, whereas the pipe 11 serves as the second pipe.

In a case where the first joint 41 has a first portion coupled to the inner surface (non-sealing surface 11d) of the back upper end of the pipe 11 as described under "Third Alternative Embodiment" above and illustrated in FIG. 20, the second joint 42 may have a first portion coupled to the inner surface of the front upper end of the pipe 12 and a second portion protruding from the front upper end of the pipe 12.

In a case where the pipes 11 and 12 each have a circular cross-sectional shape unlike in FIGS. 14 and 15, this embodiment may include, in addition to the first and second joints 41 and 42, a third joint and a nut as well as a fourth joint and a nut.

In a case where the pipes 11 and 12 each have a circular cross-sectional shape unlike in FIGS. 14 and 15, the first and second joints 41 and 42 may together be a cylinder. With this configuration, the cylinder has a portion as the first joint 41 and other portions as the second joint 42 and the third and fourth joints that are shifted in phase from the first joint 41.

Fifth Alternative Embodiment

In a case where the first and second joints 41 and 42 cannot be provided to extend along the entire circumference of the respective ends of the pipes 11 and 12 as illustrated in FIGS. 13 to 16, the back upper end of the pipe 11 and the front upper end of the pipe 12 may be structurally coupled to each other with use of the first and second joints 41 and 42 as described below.

Figure 21:
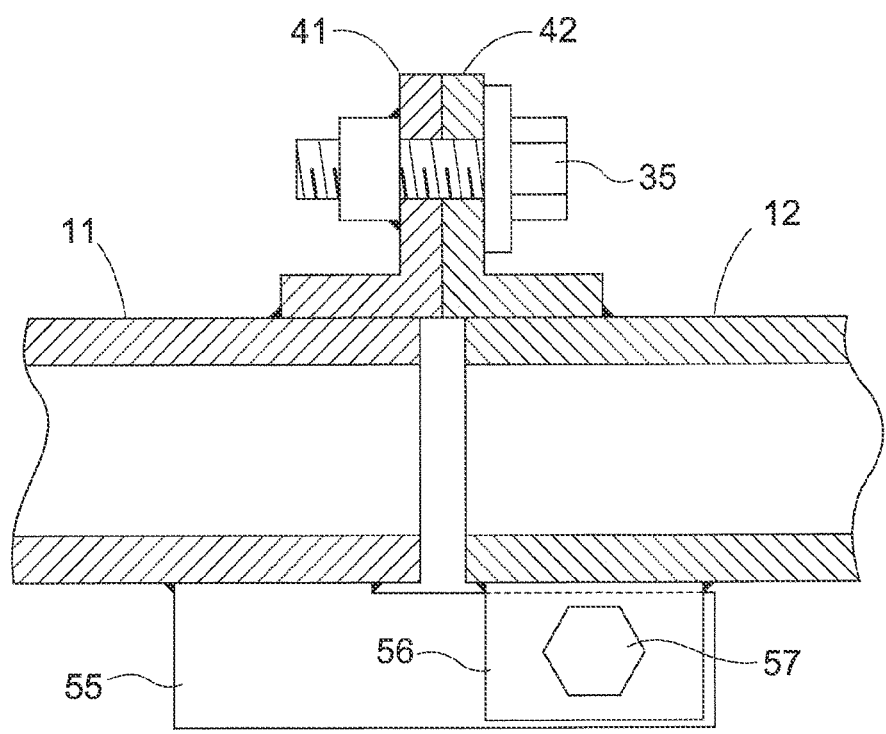
FIG. 21 is a side cross-sectional view of a portion and its nearby portion of a ROPS frame as a fifth alternative embodiment at which the back upper end of a pipe is coupled to the front upper end of another pipe.

As illustrated in FIG. 21, this embodiment includes a plate-shaped first joint 41 and a plate-shaped second joint 42 each angled in cross section and having an area of about a quadrant of the cross section of the pipes 11 and 12. The first and second joints 41 and 42 are welded to the respective outer surfaces of the respective ends of the pipes 11 and 12 and oriented orthogonally to the longitudinal direction of the pipes 11 and 12.

This embodiment includes a plate-shaped third joint 55 extending in the longitudinal direction of the pipes 11 and 12. The third joint 55 has a first portion welded to the outer surface of the back upper end of the pipe 11 and a second portion protruding from the back upper end of the pipe 11.

This embodiment also includes a plate-shaped fourth joint 56 extending in the longitudinal direction of the pipes 11 and 12 and welded to the outer surface of the front upper end of the pipe 12.

The first and second joints 41 and 42 are placed on each other in such a manner that the back upper end of the pipe 11 and the front upper end of the pipe 12 face each other. The first and second joints 41 and 42 are provided with bolts 35 extending therethrough and fastening the first and second joints 41 and 42 to each other.

The second portion of the third joint 55 and the fourth joint 56 are placed on each other. The third and fourth joints 55 and 56 are provided with a bolt 57 extending therethrough and fastening the third and fourth joints 55 and 56 to each other.

The back upper end of the pipe 11 and the front upper end of the pipe 12 are thereby coupled to each other with use of the first and second joints 41 and 42, the third and fourth joints 55 and 56, and the bolts 35 and 57.

This embodiment may be altered such that the third joint 55 is coupled to the pipe 12 and that the fourth joint 56 is coupled to the pipe 11.

Sixth Alternative Embodiment

FIGS. 13 to 16 and the first to fourth alternative embodiments each involve a first joint 41 structurally coupled to a second joint 42. This coupling structure may be applied to the coupling between the front upper end of the pipe 10 and the front lower end of the pipe 11 and/or to the coupling between the back upper end of the pipe 10 and the back lower end of the pipe 12.

FIGS. 7 to 12 each illustrate a joint 20 structurally coupled to a joint 30. This coupling structure may be applied to the coupling between the back upper end of the pipe 11 and the front upper end of the pipe 12.

The present invention is applicable to not only multipurpose work vehicles but also, for example, riding-type mowers and tractors.

The invention claimed is:

1. A roll-over protective structure (ROPS) frame for a work vehicle, comprising:
   a plurality of pipes comprising:
   a first pipe having a rear end; and
   a second pipe having a front end facing the rear end of the first pipe, the rear end and the front end being disposed in an upper portion of the ROPS frame;
   a plate-shaped first joint coupled to the rear end of the first pipe and oriented orthogonally to a longitudinal direction of the pipes;
   a plate-shaped second joint coupled to the front end of the second pipe and oriented orthogonally to the longitudinal direction of the pipes, the second joint placed on the first joint; and
   a pair of bolts each extending through the first and second joints and fastening the first and second joints to each other,
   the first pipe and the second pipe each have a pair of recesses which are recessed toward an axial area of the pipe, the pair of recesses arranged opposite to each other across the axial area, as viewed in the longitudinal direction,
   the pair of recesses includes a first recess positioned upward relative to the axial area and laterally inward relative to the axial area, and a second recess positioned downward relative to the axial area and laterally outward relative to the axial area, and the pair of bolts includes a first bolt adjacent to the first recess, and a second bolt adjacent to the second recess.

2. A work vehicle, comprising:
a ROPS frame according to claim 1.

3. A roll-over protective structure (ROPS) comprising:
a plurality of pipes comprising:
   a first pipe having an end; and
   a second pipe having an end facing the end of the first pipe;
a plate-shaped first joint coupled to the end of the first pipe and oriented orthogonally to a longitudinal direction of the pipes;
a plate-shaped second joint coupled to the end of the second pipe and oriented orthogonally to the longitudinal direction of the pipes, the second joint placed on the first joint;
a bolt extending through the first and second joints and fastening the first and second joints to each other;
a first frame member oriented in a direction crossing the first and second pipes and having an end facing the respective ends of the first and second pipes; and
a coupling member coupled to the end of the first pipe and the end of the first frame member and coupled to the end of the second pipe and the end of the first frame member.

4. The ROPS frame according to claim 3, further comprising:
a second frame member oriented in a direction crossing the first and second pipes and the first frame member and having an end facing the respective ends of the first and second pipes, and
wherein the coupling member is further coupled to the end of the first pipe and the end of the second frame member and coupled to the end of the second pipe and the end of the second frame member.

5. The ROPS frame according to claim 4, wherein:
the end of the first frame member and the end of the second frame member are coupled to each other.

6. The ROPS frame according to claim 3, wherein:
the coupling member is coupled to the end of the first pipe at a first coupling portion apart from a second coupling portion at which the coupling member is coupled to the end of the second pipe, and the respective ends of the first and second pipes face each other at a portion between the first coupling portion and the second coupling portion.

7. The ROPS frame according to claim 3, wherein:
the coupling member is coupled to the end of the first pipe with:
   the coupling member placed on an outer surface of the end of the first pipe; and
   a first auxiliary coupling member placed on the outer surface of the end of the first pipe and coupled to the coupling member, and
the coupling member is coupled to the end of the second pipe with:
   the coupling member placed on an outer surface of the end of the second pipe; and
   a second auxiliary coupling member placed on the outer surface of the end of the second pipe and coupled to the coupling member.

8. A roll-over protective structure (ROPS) frame for a work vehicle, comprising:
a plurality of pipes comprising:
   a first pipe having a rear end; and
   a second pipe having a front end facing the rear end of the first pipe, the rear end and the front end disposed in an upper portion of the ROPS frame;
a plate-shaped first joint coupled to the rear end of the first pipe and oriented orthogonally to a longitudinal direction of the pipes;
a plate-shaped second joint coupled to the front end of the second pipe and oriented orthogonally to the longitudinal direction of the pipes, the second joint placed on the first joint; and
a pair of bolts each extending through the first and second joints and fastening the first and second joints to each other,
wherein the pair of bolts are disposed in respective end portions of a virtual line in the first joint and the second joint, the virtual line being a longest line across the joint and passing an axial area of the pipe, as viewed in the longitudinal direction of the pipes, and
wherein the pair of bolts includes a first bolt positioned upward relative to the axial area and laterally inward relative to the axial area as viewed in the longitudinal direction of the pipes, and a second bolt positioned downward relative to the axial area and laterally outward relative the axial area as viewed in the longitudinal direction of the pipes.

* * * * *